(12) United States Patent
Bury et al.

(10) Patent No.: US 8,258,210 B2
(45) Date of Patent: Sep. 4, 2012

(54) STRENGTH IMPROVEMENT ADMIXTURE

(75) Inventors: Jeffrey R. Bury, Macedonia, OH (US); Thomas M. Vickers, Jr., Concord Township, OH (US); Bruce J. Christensen, Solon, OH (US)

(73) Assignee: Construction Research & Technology GmbH (DE)

( * ) Notice: Subject to any disclaimer, the term of this patent is extended or adjusted under 35 U.S.C. 154(b) by 1190 days.

(21) Appl. No.: 10/787,507

(22) Filed: Feb. 26, 2004

(65) Prior Publication Data

US 2004/0198873 A1    Oct. 7, 2004

Related U.S. Application Data

(60) Provisional application No. 60/450,374, filed on Feb. 26, 2003.

(51) Int. Cl.
C04B 40/06 (2006.01)
C04B 28/00 (2006.01)
C04B 24/00 (2006.01)

(52) U.S. Cl. .......... 524/2; 524/4; 524/5; 106/724; 106/727; 106/728; 106/729; 106/804; 106/808; 106/809; 106/815; 106/823; 106/725

(58) Field of Classification Search .......... 524/2, 4, 524/5; 106/724, 725, 727, 728, 729, 804, 106/808, 809, 815, 823

See application file for complete search history.

(56) References Cited

U.S. PATENT DOCUMENTS

| | | | |
|---|---|---|---|
| 4,401,472 A | 8/1983 | Gerber | |
| 4,519,842 A | 5/1985 | Gerber | |
| 4,943,323 A | 7/1990 | Gartner et al. | |
| 4,990,190 A | 2/1991 | Myers et al. | |
| 5,084,103 A | 1/1992 | Myers et al. | |
| 5,158,996 A | 10/1992 | Valenti | |
| 5,162,402 A | 11/1992 | Ogawa et al. | |
| 5,203,919 A | 4/1993 | Bobrowski et al. | |
| 5,358,566 A | 10/1994 | Tanaka et al. | |
| 5,393,343 A | 2/1995 | Darwin et al. | |
| 5,427,617 A | 6/1995 | Bobrowski et al. | |
| 5,494,516 A | 2/1996 | Drs et al. | |
| 5,583,183 A | 12/1996 | Darwin et al. | |
| 5,591,259 A | 1/1997 | Huang et al. | |
| 5,609,681 A | 3/1997 | Drs et al. | |
| 5,612,396 A | 3/1997 | Valenti et al. | |
| 5,629,048 A | 5/1997 | Kinney | |
| 5,633,298 A | 5/1997 | Arfaei et al. | |
| 5,643,978 A | 7/1997 | Darwin et al. | |
| 5,660,626 A | 8/1997 | Ohta et al. | |
| 5,661,206 A | 8/1997 | Tanaka et al. | |
| 5,665,158 A | 9/1997 | Darwin et al. | |
| 5,668,195 A | 9/1997 | Leikauf | |
| 5,674,929 A | 10/1997 | Melbye | |
| 5,703,174 A | 12/1997 | Arfaei et al. | |
| 5,725,657 A | 3/1998 | Darwin et al. | |
| 5,728,207 A | 3/1998 | Arfaei et al. | |
| 5,786,425 A | 7/1998 | Sperling et al. | |
| 5,792,252 A | 8/1998 | Sprouts | |
| 5,840,114 A | 11/1998 | Jeknavorian et al. | |
| 5,895,525 A | 4/1999 | Huang et al. | |
| 5,912,284 A | 6/1999 | Hirata et al. | |
| 5,922,124 A | 7/1999 | Supplee | |
| 6,008,275 A | 12/1999 | Moreau et al. | |
| 6,063,184 A | 5/2000 | Leikauf et al. | |
| 6,136,088 A | 10/2000 | Farrington | |
| 6,136,950 A | 10/2000 | Vickers, Jr. et al. | |
| 6,187,841 B1 | 2/2001 | Tanaka et al. | |
| 6,267,814 B1 | 7/2001 | Bury et al. | |
| 6,284,867 B1 | 9/2001 | Vickers, Jr. et al. | |
| 6,290,770 B1 * | 9/2001 | Moreau et al. | 106/708 |
| 6,310,143 B1 | 10/2001 | Vickers, Jr. et al. | |
| 6,391,106 B2 | 5/2002 | Moreau et al. | |
| 2003/0127026 A1 * | 7/2003 | Anderson et al. | 106/724 |
| 2003/0167973 A1 | 9/2003 | Peev et al. | |

FOREIGN PATENT DOCUMENTS

DE    199 26 611 A1    6/1999

OTHER PUBLICATIONS

Tom Pyle, Robert S. Sugar, Abstract—"Rapid Strength Portland Cement Concrete" California Department of Transportation, Materials Engineering and Testing Services, Caltrans/Paving Association, Concrete Paving Conference. Dec. 2001.

Tom Pyle, "Fast-Setting Concrete Evaluated in California" Apr. 2002 Better Roads.

Jim Anderson, "Paving Repair Finds a Four-Hour Champion" Dec. 2001 Concrete Construction.

Ed Rice, Four vs. Two Hours, Feb. 2002, Concrete Construction.

* cited by examiner

*Primary Examiner* — Kelechi Egwim
(74) *Attorney, Agent, or Firm* — Curatolo Sidoti Co., LPA; Joseph G. Curatolo; Salvatore A. Sidoti

(57) ABSTRACT

A strength improvement admixture composition is provided that increases the compressive strength of cementitious compositions without negatively increasing the setting time. The admixture comprises the components of a polycarboxylate dispersant, a set retarder, and a strength improvement additive.

25 Claims, No Drawings

STRENGTH IMPROVEMENT ADMIXTURE

CROSS REFERENCE TO RELATED APPLICATIONS

This application claims the benefit of the filing date of U.S. Provisional Application for Patent Ser. No. 60/450,374 filed Feb. 26, 2003.

BACKGROUND

Dispersants have been used in the construction industry, either singularly or as part of water-reducing compositions, to disperse cementitious mixtures allowing for a reduction in mix water content while maintaining flowability and workability of the mixture. This reduction in the water cement ratio leads to increases in compressive strength and is one of the main reasons that water-reducing admixtures are used. Dispersants such as sulfonated melamine formaldehyde condensate (SMF), sulfonated naphthalene formaldehyde condensate (BNS), and lignosulfonates are commonly used as dispersants. However, these compounds are best suited for specific tasks. BNS and SMF are particularly difficult to use reliably and cost effectively at low levels and are best suited for use as high-range water reducers (>12% water-reduction). Lignosulfonates in general tend to be best suited for lower water-reduction levels (<15%) and can cause excessive set retardation when used at higher amounts. Other materials such as salts of hydroxycarboxylic acids and sugars such as glucose or sucrose can also provide some degree of water reduction. In addition to the water reduction, the hydroxycarboxylic acids and sugars have commonly been used to retard the rate of set, which can lead to further improvements in compressive strength.

Dispersants such as BNS or lignosulfonates are often combined with additional components like sugars to achieve improved strength performance. These compositions usually must also contain accelerating components to offset excessive retardation. Even in combination with accelerating type components, formulated water reducers such as these can still retard excessively when used across a wide water reduction range in concrete mixtures containing pozzolans such as fly ash or slag, or in concrete that is mixed and placed at cool temperatures (50° F. or below). Additional accelerating admixtures are sometimes needed in an effort to offset this excessive retardation and depending on the severity, can be minimally effective. Excessive retardation is undesirable in that it can delay jobsite activity, prevent forms from being stripped, delay finishing operations or lead to low early age strengths. Providing an admixture with full range (Type A to F) water reducing capability and improved compressive strength while maintaining normal setting or easily controllable setting characteristics is desirable.

One improvement in the prior art was to use polycarboxylate dispersants. Polycarboxylate dispersants are structured with a polymeric backbone, such as a carbon chain backbone, with pendant moieties that provide the dispersing capabilities of the molecule. For example, polyacrylic acid has carboxylic groups attached to the backbone, additionally, side chain moieties such as polyoxyalkylenes can be attached to the carboxylic groups to provide further dispersing capabilities. These polymers attach to the cement grains and produce dispersion by means of both electrostatic repulsion and steric hindrance, resulting in increased fluidity.

It is desirable to provide an admixture comprising a polycarboxylate dispersant that improves the compressive strength of cementitious compositions without exponentially increasing the set time when used with set retarders, as is observed with BNS and lignosulfonate dispersants. Therefore, an admixture which improves the compressive strength of the hardened cementitious composition without producing any other changes would be advantageous in the industry.

U.S. Pat. No. 4,401,472 to Gerber discloses an additive comprising a poly(hydroxyalkylated) polyethyleneamine or a poly(hydroxyalkylated)polyethyleneimine or mixtures thereof, wherein the additive is present in a hydraulic cement mix in an amount sufficient to increase the compressive strength of the hardened mix.

U.S. Pat. No. 4,519,842 to Gerber discloses a cement mix comprising an admixture of poly(hydroxyalkylated) polyamine, alkoxylated poly(hydroxyalkylated)polyamine hydroxyalkylated derivatives of the compounds hydrazine, 1, 2, diaminopropane and polyglycoldiamine and mixtures thereof, wherein the admixture is present in amounts sufficient to increase the compressive strength of the hardened cement mix.

SUMMARY

An admixture composition that improves the compressive strength of cementitious compositions without negatively effecting the setting time is provided which comprises the components of polycarboxylate dispersant, set retarder and a strength improvement additive selected from the group consisting of poly(hydroxyalkylated)polyethyleneamines, poly (hydroxyalkylated)polyethylenepolyamines, poly(hydroxyalkylated)polyethyleneimines, poly(hydroxyalkylated) polyamines, hydrazines, 1,2-diaminopropane, polyglycoldiamine, poly(hydroxyalkyl)amines and mixtures thereof.

A cementitious composition is provided that comprises hydraulic cement and a strength improvement admixture composition, wherein the admixture composition comprises the components of polycarboxylate dispersant, set retarder and a strength improvement additive selected from the group consisting of poly(hydroxyalkylated)polyethyleneamines, poly(hydroxyalkylated)polyethylenepolyamines, poly(hydroxyalkylated)polyethyleneimines, poly(hydroxyalkylated) polyamines, hydrazines, 1,2-diaminopropane, polyglycoldiamine, poly(hydroxyalkyl)amines and mixtures thereof.

A method of making a cementitious composition is provided which comprises forming a mixture of water, hydraulic cement and a strength improvement admixture composition, wherein the admixture composition comprises the components of polycarboxylate dispersant, set retarder and a strength improvement additive selected from the group consisting of poly(hydroxyalkylated)polyethyleneamines, poly (hydroxyalkylated)polyethylenepolyamines, poly(hydroxyalkylated)polyethyleneimines, poly(hydroxyalkylated) polyamines, hydrazines, 1,2-diaminopropane, polyglycoldiamine, poly(hydroxyalkyl)amines and mixtures thereof.

DETAILED DESCRIPTION

A strength improvement admixture composition for cementitious compositions is provided, as well as a novel cementitious composition containing such an admixture composition and a method for preparing such a cementitious composition.

It is known in the prior art that when a BNS, SMF or lignin dispersant is combined with a set retarder, exponential retardation, as compared to additive retardation, is observed. The excessive retardation caused by the combination serves to greatly increase the setting time of the cementitious composition. It has been demonstrated that when a BNS, SMF or lignin dispersant is added to a cementitious composition containing a set retarder, there is a very narrow range of addition in which to improve the strength of a cementitious mix before retardation becomes excessive. In comparison, polycarboxylate dispersants have a wide range of addition with little or no retardation effect upon the cementitious mixture and provide increased compressive strength to cementitious mixtures.

Polycarboxylate dispersants are very effective at dispersing and reducing the water content in hydraulic cementitious compositions. These dispersants operate by binding to a cement particle and developing both electrostatic and steric repulsive forces, thereby keeping the particles apart, resulting in a more fluid system.

The term polycarboxylate dispersant used throughout this specification refers to polymers with a carbon backbone with pendant side chains, wherein at least a portion of the side chains are attached to the backbone through a carboxyl group or an ether group. The term dispersant is also meant to include those chemicals which also function as a plasticizer, water reducer, fluidizer, antiflocculating agent, or superplasticizer for cementitious compositions. Examples of polycarboxylate dispersants can be found in U.S. Pat. Nos. 6,267,814, 6,290,770, 6,310,143, 6,187,841, 5,158,996, 6,008,275, 6,136,950, 6,284,867, 5,609,681, 5,494,516; 5,674,929, 5,660,626, 5,668,195, 5,661,206, 5,358,566, 5,162,402, 5,798,425, 5,612,396, 6,063,184, and 5,912,284, 5,840,114, 5,753,744, 5,728,207, 5,725,657, 5,703,174, 5,665,158, 5,643,978, 5,633,298, 5,583,183, and 5,393,343, which are all incorporated herein by reference.

In one embodiment the admixture composition comprises about 5% to about 80% polycarboxylate dispersant based on the total dry weight of the admixture composition components. In another embodiment the admixture composition comprises about 20% to about 60% polycarboxylate dispersant based on the total dry weight of the admixture composition components. In another embodiment a cementitious composition comprises about 0.02% to about 2% polycarboxylate dispersant by weight of cementitious binder. In a further embodiment a cementitious composition comprises about 0.02% to about 0.24% polycarboxylate dispersant by weight of cementitious binder.

The polycarboxylate dispersants used in the system can be at least one of the dispersant formulas a) through k):

a) a dispersant of Formula (I):

$$-(NH-CH(-(CH_2)_m-COOX)-(CH_2)_n-C(=O))_a-(NH-CH(-(CH_2)_{m'}-C(=O)-Q-(R)_pR_1)-(CH_2)_{n'}-C(=O))_b-(NH-CH(-(CH_2)_{m''}-C(=O)-Q-Y)-(CH_2)_{n''}-C(=O))_c-(Z)_d-$$

wherein in Formula (I)
X is at least one of hydrogen, an alkali earth metal ion, an alkaline earth metal ion, ammonium ion, or amine;
R is at least one of $C_1$ to $C_6$ alkyl(ene) ether or mixtures thereof or $C_1$ to $C_6$ alkyl(ene) imine or mixtures thereof;
Q is at least one of oxygen, NH, or sulfur;
p is a number from 1 to about 300 resulting in at least one of a linear side chain or branched side chain;
$R_1$ is at least one of hydrogen, $C_1$ to $C_{20}$ hydrocarbon, or functionalized hydrocarbon containing at least one of —OH, —COOH, an ester or amide derivative of —COOH, sulfonic acid, an ester or amide derivative of sulfonic acid, amine, or epoxy;
Y is at least one of hydrogen, an alkali earth metal ion, an alkaline earth metal ion, ammonium ion, amine, a hydrophobic hydrocarbon or polyalkylene oxide moiety that functions as a defoamer;
m, m', m'', n, n', and n'' are each independently 0 or an integer between 1 and about 20;
Z is a moiety containing at least one of i) at least one amine and one acid group, ii) two functional groups capable of incorporating into the backbone selected from the group consisting of dianhydrides, dialdehydes, and di-acidchlorides, or iii) an imide residue; and
wherein a, b, c, and d reflect the mole fraction of each unit wherein the sum of a, b, c, and d equal one, wherein a, b, c, and d are each a value greater than or equal to zero and less than one, and at least two of a, b, c, and d are greater than zero;

b) a dispersant of Formula (II):

$$\left[\left(-CH-CH_2-\bigcirc\right)_x\left(\begin{array}{c}-CH-CH-\\ | \quad | \\ A \quad A\end{array}\right)_y\left(\begin{array}{c}-CH-CH-\\ | \quad | \\ B \quad C=O \\ \quad | \\ \quad O \\ \quad | \\ (R-O)_m R_1\end{array}\right)_z\right]_n$$

wherein in Formula (II):
A is COOM or optionally in the "y" structure an acid anhydride group (—CO—O—CO—) is formed in place of the A groups between the carbon atoms to which the A groups are bonded to form an anhydride;
B is COOM
M is hydrogen, a transition metal cation, the residue of a hydrophobic polyalkylene glycol or polysiloxane, an alkali metal ion, an alkaline earth metal ion, ferrous ion, aluminum ion, (alkanol)ammonium ion, or (alkyl)ammonium ion;
R is a $C_{2-6}$ alkylene radical;
R1 is a $C_{1-20}$ alkyl, $C_{6-9}$ cycloalkyl, or phenyl group;
x, y, and z are a number from 0.01 to 100;
m is a number from 1 to 100; and
n is a number from 10 to 100;

c) a dispersant comprising at least one polymer or a salt thereof having the form of a copolymer of
i) a maleic anhydride half-ester with a compound of the formula $RO(AO)_mH$, wherein R is a $C_1$-$C_{20}$ alkyl group, A is a $C_{2-4}$ alkylene group, and m is an integer from 2-16; and
ii) a monomer having the formula $CH_2=CHCH_2—(OA)_n$OR,
wherein n is an integer from 1-90 and R is a $C_{1-20}$ alkyl group;

d) a dispersant obtained by copolymerizing 5 to 98% by weight of an (alkoxy)polyalkylene glycol mono(meth)acrylic ester monomer (a) represented by the following general formula (1):

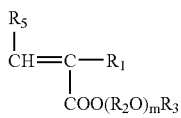
(1)

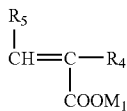
(2)

wherein $R_1$ stands for hydrogen atom or a methyl group, $R_2O$ for one species or a mixture of two or more species of oxyalkylene group of 2 to 4 carbon atoms, providing two or more species of the mixture may be added either in the form of a block or in a random form, $R_3$ for a hydrogen atom or an alkyl group of 1 to 5 carbon atoms, and m is a value indicating the average addition mol number of oxyalkylene groups that is an integer in the range of 1 to 100, 95 to 2% by weight of a (meth)acrylic acid monomer (b) represented by the above general formula (2), wherein $R_4$ and $R_5$ are each independently a hydrogen atom or a methyl group, and $M_1$ for a hydrogen atom, a monovalent metal atom, a divalent metal atom, an ammonium group, or an organic amine group, and 0 to 50% by weight of other monomer (c) copolymerizable with these monomers, provided that the total amount of (a), (b), and (c) is 100% by weight;

e) a graft polymer that is a polycarboxylic acid or a salt thereof, having side chains derived from at least one species selected from the group consisting of oligoalkyleneglycols, polyalcohols, polyoxyalkylene amines, and polyalkylene glycols;

f) a dispersant of Formula (III):

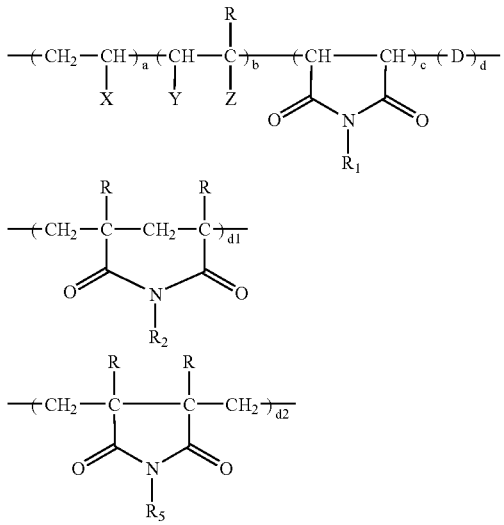

wherein in Formula (III):
D=a component selected from the group consisting of the structure d1, the structure d2, and mixtures thereof;

X=H, $CH_3$, $C_2$ to $C_6$ Alkyl, Phenyl, p-Methyl Phenyl, or Sulfonated Phenyl;
Y=H or —COOM;
R=H or $CH_3$;
Z=H, —$SO_3M$, —$PO_3M$, —COOM, —$O(CH_2)_nOR_3$ where n=2 to 6, —$COOR_3$, or —$(CH_2)_nOR_3$ where n=0 to 6, —$CONHR_3$, —$CONHC(CH_3)_2$ $CH_2SO_3M$, —$COO(CHR_4)_nOH$ where n=2 to 6, or —$O(CH_2)_nOR_4$ wherein n=2 to 6;
$R_1$, $R_2$, $R_3$, $R_5$ are each independently —$(CHRCH_2O)_mR_4$ random copolymer of oxyethylene units and oxypropylene units where m=10 to 500 and wherein the amount of oxyethylene in the random copolymer is from about 60% to 100% and the amount of oxypropylene in the random copolymer is from 0% to about 40%;
$R_4$=H, Methyl, $C_2$ to about $C_6$ Alkyl, or about $C_6$ to about $C_{10}$ aryl;
M=H, Alkali Metal, Alkaline Earth Metal, Ammonium, Amine, triethanol amine, Methyl, or $C_2$ to about $C_6$ Alkyl;
a=0 to about 0.8;
b=about 0.2 to about 1.0;
c=0 to about 0.5;
d=0 to about 0.5; and
wherein a, b, c, and d represent the mole fraction of each unit and the sum of a, b, c, and d is 1.0;

g) a dispersant of Formula (IV):

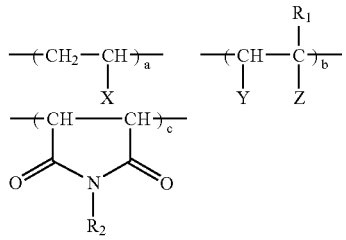

wherein in Formula (IV):
the "b" structure is one of a carboxylic acid monomer, an ethylenically unsaturated monomer, or maleic anhydride wherein an acid anhydride group (—CO—O—CO—) is formed in place of the groups Y and Z between the carbon atoms to which the groups Y and Z are bonded respectively, and the "b" structure must include at least one moiety with a pendant ester linkage and at least one moiety with a pendant amide linkage;
X=H, $CH_3$, $C_2$ to $C_6$ Alkyl, Phenyl, p-Methyl Phenyl, p-Ethyl Phenyl, Carboxylated Phenyl, or Sulfonated Phenyl;
Y=H, —COOM, —COOH, or W;
W=a hydrophobic defoamer represented by the formula $R_5O$—$(CH_2CH_2O)_s$—$(CH_2C(CH_3)HO)_t$—$(CH_2CH_2O)_u$ where s, t, and u are integers from 0 to 200 with the proviso that t>(s+u) and wherein the total amount of hydrophobic defoamer is present in an amount less than about 10% by weight of the polycarboxylate dispersant;
Z=H, —COOM, —$O(CH_2)_nOR_3$ where n=2 to 6, —$COOR_3$, —$(CH_2)_nOR_3$ where n=0 to 6, or —$CONHR_3$;
$R_1$=H, or $CH_3$;
$R_2$, $R_3$, are each independently a random copolymer of oxyethylene units and oxypropylene units of the general formula —$(CH(R_1)CH_2O)_mR_4$ where m=10 to 500 and wherein the amount of oxyethylene in the random copolymer is from about 60% to 100% and the amount of oxypropylene in the random copolymer is from 0% to about 40%;

R4=H, Methyl, or $C_2$ to $C_8$ Alkyl;

$R_5$=$C_1$ to $C_{18}$ alkyl or $C_6$ to $C_{18}$ alkyl aryl;

M=Alkali Metal, Alkaline Earth Metal, Ammonia, Amine, monoethanol amine, diethanol amine, triethanol amine, morpholine, imidazole;

a=0.01-0.8;

b=0.2-0.99;

c=0-0.5; and wherein a, b, c represent the mole fraction of each unit and the sum of a, b, and c, is 1;

h) a random copolymer corresponding to the following Formula (V) in free acid or salt form having the following monomer units and numbers of monomer units:

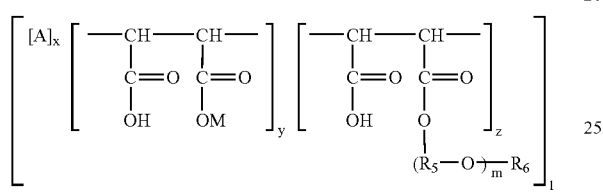

wherein A is selected from the moieties (i) or (ii)

(i) —$CR_1R_2$—$CR_3R_4$—

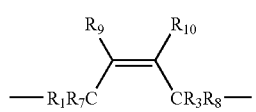

wherein $R_1$ and $R_3$ are selected from substituted benzene, $C_{1-8}$ alkyl, $C_{2-8}$ alkenyl, $C_{2-8}$ alkylcarbonyl, $C_{1-8}$ alkoxy, carboxyl, hydrogen, and a ring, $R_2$ and $R_4$ are selected from the group consisting of hydrogen and $C_{1-4}$ alkyl, wherein $R_1$ and $R_3$ can together with $R_2$ and/or $R_4$ when $R_2$ and/or $R_4$ are $C_{1-4}$ alkyl form the ring;

$R_7$, $R_8$, $R_9$, and $R_{10}$ are individually selected from the group consisting of hydrogen, $C_{1-6}$ alkyl, and a $C_{2-8}$ hydrocarbon chain, wherein $R_1$ and $R_3$ together with $R_7$ and/or $R_8$, $R_9$, and $R_{10}$ form the $C_{2-8}$ hydrocarbon chain joining the carbon atoms to which they are attached, the hydrocarbon chain optionally having at least one anionic group, wherein the at least one anionic group is optionally sulfonic;

M is selected from the group consisting of hydrogen, and the residue of a hydrophobic polyalkylene glycol or a polysiloxane, with the proviso that when A is (ii) and M is the residue of a hydrophobic polyalkylene glycol, M must be different from the group —$(RO)_mR_6$;

$R_5$ is a $C_{2-8}$ alkylene radical;

$R_6$ is selected from the group consisting of $C_{1-20}$ alkyl, $C_{6-9}$ cycloalkyl and phenyl;

n, x, and z are numbers from 1 to 100;

y is 0 to 100;

m is 2 to 1000;

the ratio of x to (y+z) is from 1:10 to 10:1 and the ratio of y:z is from 5:1 to 1:100;

i) a copolymer of oxyalkyleneglycol-alkenyl ethers and unsaturated dicarboxylic acids, comprising:

i) 0 to 90 mol % of at least one component of the formula 3a or 3b:

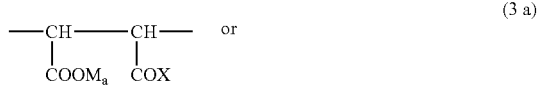

wherein M is a hydrogen atom, a mono- or divalent metal cation, an ammonium ion or an organic amine residue, a is 1, or when M is a divalent metal cation a is ½;

wherein X is —$OM_a$,

—O—$(C_mH_{2m}O)_n$—$R^1$ in which $R^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulphonic substituted aryl radical containing 6 to 14 carbon atoms, m is 2 to 4, and n is 0 to 100, —$NHR_2$, —$N(R^2)_2$ or mixtures thereof in which $R^2$=$R^1$ or —CO—$NH_2$; and wherein Y is an oxygen atom or —$NR^2$;

ii) 1 to 89 mol % of components of the general formula 4:

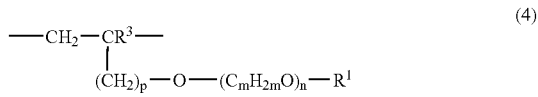

wherein $R_3$ is a hydrogen atom or an aliphatic hydrocarbon radical containing from 1 to 5 carbon atoms, p is 0 to 3, and $R_1$ is hydrogen, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulfonic substituted aryl radical containing 6 to 14 carbon atoms, m is 2 to 4, and n is 0 to 100, and iii) 0.1 to 10 mol % of at least one component of the formula 5a or 5b:

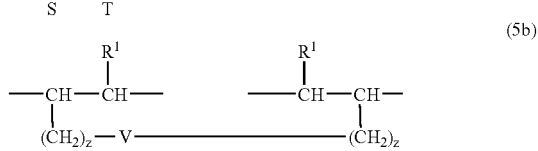

wherein S is a hydrogen atom or —$COOM_a$ or —$COOR_5$, T is —$COOR_5$, —W—$R_7$, —CO—[—NH—$(CH_2)$ 3)—]$_s$—W—R$_7$, —CO—O—(CH$_2$)$_z$—W—R$_7$, a radical of the general formula:

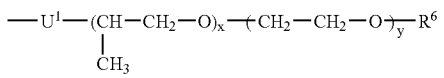

or —(CH$_2$)$_z$—V—(CH$_2$)$_z$—CH=CH—R$_1$, or when S is —COOR$_5$ or —COOM$_a$, U$_1$ is —CO—NHM—, —O— or —CH$_2$O, U$_2$ is —NH—CO—, —O— or —OCH$_2$, V is —O—CO—C$_6$H$_4$—CO—O— or —W—, and W is

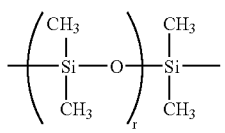

R4 is a hydrogen atom or a methyl radical, R5 is an aliphatic hydrocarbon radical containing 3 to 20 carbon atoms, a cycloaliphatic hydrocarbon radical containing 5 to 8 carbon atoms or an aryl radical containing 6 to 14 carbon atoms, R$_6$=R$_1$ or

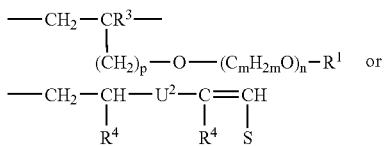

R$_7$=R$_1$ or

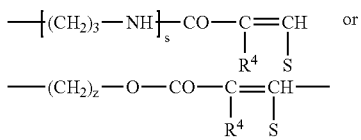

r is 2 to 100, s is 1 or 2, x is 1 to 150, y is 0 to 15 and z is 0 to 4;

iv) 0 to 90 mol % of at least one component of the formula 6a, 6b, or 6c:

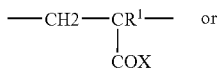  (6a)

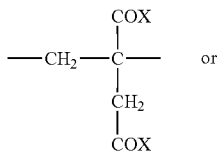  (6b)

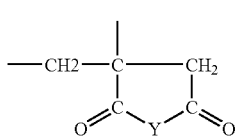  (6c)

wherein M is a hydrogen atom, a mono- or divalent metal cation, an ammonium ion or an organic amine residue, a is 1, or when M is a divalent metal cation a is ½;

wherein X is —OM$_a$,
—O—(C$_m$H$_{2m}$O)$_n$—R$^1$ in which R$^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, C$_{1-14}$ alkyl, or sulphonic substituted aryl radical containing 6 to 14 carbon atoms, m is 2 to 4, and n is 0 to 100,
—NH—(C$_m$H$_{2m}$O)$_n$—R$^1$,
—NHR$_2$, —N(R$^2$)$_2$ or mixtures thereof in which R$^2$=R$^1$ or
—CO—NH$_2$; and wherein Y is an oxygen atom or —NR$^2$;

j) a copolymer of dicarboxylic acid derivatives and oxyalkylene glycol-alkenyl ethers, comprising:
i) 1 to 90 mol. % of at least one member selected from the group consisting of structural units of formula 7a and formula 7b:

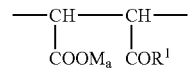  (7a)

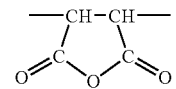  (7b)

wherein M is H, a monovalent metal cation, a divalent metal cation, an ammonium ion or an organic amine;

a is ½ when M is a divalent metal cation or 1 when M is a monovalent metal cation;

wherein R$^1$ is —OM$_a$, or
—O—(CH$_2$mO)n—R$^2$ wherein R$^2$ is H, a C$_{1-20}$ aliphatic hydrocarbon, a C$_{5-8}$ cycloaliphatic hydrocarbon, or a C$_{6-14}$ aryl that is optionally substituted with at least one member selected from the group consisting of COOM$_a$, —(SO$_3$)M$_a$, and —(PO$_3$)M$_{a2}$;

m is 2 to 4;

n is 1 to 200;

ii) 0.5 to 80 mol. % of the structural units of formula 8:

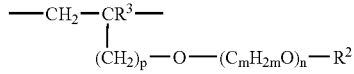  (8)

wherein R$^3$ is H or a C$_{1-5}$ aliphatic hydrocarbon;

p is 0 to 3;

R$^2$ is H, a C$_{1-20}$ aliphatic hydrocarbon, a C$_{5-8}$ cycloaliphatic hydrocarbon, or a C$_{6-14}$ aryl that is optionally substituted with at least one member selected from the group consisting of —COOM$_a$, (SO$_3$)M$_a$, and —(PO$_3$) M$_{a2}$;

m is 2 to 4;

n is 1 to 200;

iii) 0.5 to 80 mol. % structural units selected from the group consisting of formula 9a and formula 9b:

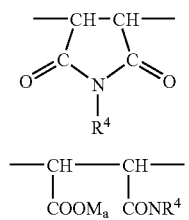

(9a)

—CH——CH—
 |       |
 COOM$_a$  CONR$^4$ (9b)

wherein R$^4$ is H, C$_{1-20}$ aliphatic hydrocarbon that is optionally substituted with at least one hydroxyl group, —(C$_m$H$_{2m}$O)$_n$—R$^2$, CO—NH—R$^2$, C$_{5-8}$ cycloaliphatic hydrocarbon, or a C$_{6-14}$ aryl that is optionally substituted with at least one member selected from the group consisting of —COOM$_a$, —(SO$_3$)M$_a$, and —(PO$_3$)M$_{a2}$;

M is H, a monovalent metal cation, a divalent metal cation, an ammonium ion or an organic amine;

a is ½ when M is a divalent metal cation or 1 when M is a monovalent metal cation;

R$^2$ is H, a C$_{1-20}$ aliphatic hydrocarbon, a C$_{5-8}$ cycloaliphatic hydrocarbon, or a C$_{6-14}$ aryl that is optionally substituted with at least one member selected from the group consisting of —COOM$_a$, —(SO$_3$)M$_a$, and —(PO$_3$)M$_{a2}$;

m is 2 to 4;

n is 1 to 200;

iv) 1 to 90 mol. % of structural units of formula 10

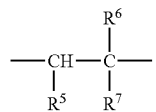

(10)

wherein R$^5$ is methyl, or methylene group, wherein R$^5$ forms one or more 5 to 8 membered rings with R$^7$;

R$^6$ is H, methyl, or ethyl;

R$^7$ is H, a C$^-{}_{1-20}$ aliphatic hydrocarbon, a C$_{6-14}$ aryl that is optionally substituted with at least one member selected from the group consisting of —COOM$_a$, (SO$_3$)M$_a$, and —(PO$_3$)M$_{a2}$, a C$_{5-8}$ cycloaliphatic hydrocarbon, —OCOR$^4$, —OR$^4$, and —COOR$^4$, wherein R$^4$ is H, a C$_{1-20}$ aliphatic hydrocarbon that is optionally substituted with at least one —OH, —(C$_m$H$_{2m}$O)$_n$—R$^2$, —CO—NH—R$^2$, C$_{5-8}$ cycloaliphatic hydrocarbon, or a C$_{6-14}$ aryl residue that is optionally substituted with a member selected from the group consisting of —COOM$_a$, —(SO$_3$)M$_a$, and —(PO$_3$)M$_{a2}$.

In formula (e) the word "derived" does not refer to derivatives in general, but rather to any polycarboxylic acid/salt side chain derivatives of oligoalkyleneglycols, polyalcohols and polyalkylene glycols that are compatible with dispersant properties and do not destroy the graft polymer.

The preferred substituents in the optionally substituted aryl radical of formula (i), containing 6 to 14 carbon atoms, are hydroxyl, carboxyl, C$_{1-14}$ alkyl, or sulfonate groups.

The preferred substituents in the substituted benzene are hydroxyl, carboxyl, C$_{1-14}$ alkyl, or sulfonate groups.

Set retarding, or also known as delayed-setting or hydration control, admixtures are used to retard, delay, or slow the rate of setting of concrete. They can be added to the concrete mix upon initial batching or sometime after the hydration process has begun. Set retarders are used to offset the accelerating effect of hot weather on the setting of concrete, or delay the initial set of concrete or grout when difficult conditions of placement occur, or problems of delivery to the job site, or to allow time for special finishing processes. Most set retarders also act as low level water reducers and can also be used to entrain some air into concrete. Lignosulfonates, hydroxylated carboxylic acids, borax, gluconic, tartaric and other organic acids, phosphonates, certain carbohydrates such as sugars and sugar-acids and mixtures thereof can be used as retarding admixtures. In one embodiment the admixture composition comprises about 0.5% to about 40% set retarder based on the total dry weight of the admixture composition components. In another embodiment the admixture composition comprises about 2% to about 25% set retarder based on the total dry weight of the admixture composition components. In another embodiment a cementitious composition comprises about 0.002% to about 0.2% set retarder by weight of cementitious binder. In a further embodiment a cementitious composition comprises about 0.005% to about 0.08% set retarder by weight of cementitious binder.

The strength improvement additive is added to hydraulic cement mixes, such as portland cement concretes, grouts and mortars, high alumina cement concretes, grouts and mortars, and dry mixes for making such concretes, grouts and mortars in amounts sufficient to increase the compressive strength of the hydraulic cement mix. The additive is at least one of poly(hydroxyalkylated)polyethyleneamines, poly(hydroxyalkylated)polyethylenepolyamines, poly(hydroxyalkylated) polyethyleneimines, poly(hydroxyalkylated)polyamines, hydrazines, 1,2-diaminopropane, polyglycoldiamine, poly (hydroxyalkyl)amine and mixtures thereof. In one embodiment the admixture composition comprises about 0.5% to about 40% strength improvement additive based on the total dry weight of the admixture composition components. In another embodiment the admixture composition comprises about 2% to about 25% strength improvement additive based on the total dry weight of the admixture composition components. In another embodiment a cementitious composition comprises about 0.0001% to about 0.2% strength improvement additive by weight of cementitious binder. In a further embodiment a cementitious composition comprises about 0.004% to about 0.08% strength improvement additive by weight of cementitious binder.

Illustrative examples of the strength improvement additive include, but are not limited to, N,N,N'-tri-(hydroxyethyl)ethylenediamine, N,N,N'-tri-(hydroxyethyl)diethylenediamine, N,N'-di-(hydroxyethyl)ethylenediamine, N,N'-bis(2-hydroxypropyl)diethylenetriamine, N,N,N',N'-tetra(hydroxyethyl)ethylenediamine, N,N,N',N',N''-penta(hydroxyethyl) diethylenetriamine, N,N'-bis(2-hydroxypropyl)-N,N,N'-tri (hydroxyethyl)diethylenetriamine, poly(hydroxyethyl) polyethyleneimine, di(hydroxyethyl) 1,2-diaminopropane, tetra(hydroxyethyl) 1,2-diaminopropane, di(hydroxyethyl) hydrazine, tetra(hydroxyethyl)hydrazine, ethoxylated polyglycoldiamine, triisopropanolamine and mixtures thereof.

The poly(hydroxyalkylated)polyethyleneamine can have the following formula:

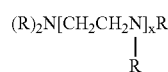

(R)$_2$N[CH$_2$CH$_2$N]$_x$R
           |
           R wherein x is 1,2 or 3 and R is selected from the group consisting of hydrogen, 2-hydroxyethyl, and 2-hydroxypropyl, each R can be the same or different, and at least 40% of the R groups are hydroxyalkyl, with no more than 40% of the R groups being hydroxypropyl.

The poly(hydroxyalkylated)polyamines can have the following formula:

$(R')_2NCH_2CH_2N(R')_2$ wherein R' is $(CH_2CH_2O)_yH$, wherein y is 0, 1 or 2, wherein no more than one-half (½) of the compounds of the formula have y equal to 0, and each R' can be the same or different.

The derivatives of hydrazine, 1,2-diaminoprpane and polyglycoldiamine can have the following formula:

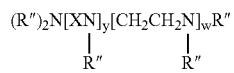

wherein R" is selected from the group consisting of $(CH_2CH_2O)_yH$ and

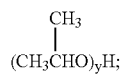

wherein X is a covalent bond or a divalent organic radical selected from the group consisting of $CH_2$, $CH_2CH_2$,

and $CH_2CH_2CH_2OCH_2CH_2OCH_2CH_2OCH_2CH_2CH_2$;
wherein y and v are 0, 1 or 2;
wherein w is 0 or 1;
wherein v and w cannot both be 0; and wherein no more than one-half (½) of the R" are hydrogen.

The poly(hydroxyalkyl)amines can have the following formula:

$(R^3)_nH_qN$

Where $R^3$ is $[(CHR^4)_m(CHR^4)P]_pH$
where $R^4$ is independently H or $CH_3$
where m=1 or 2
where n=2 or 3
where p=1 or 2
where q=3−n
and each $R^3$ can be the same or different for example, all hydroxypropyl, or mixed hydroxyethyl and hydroxypropyl.

An ethoxylated amine commercially available from Union Carbide Corporation under the trademark Ethoxylated Amine HH which when ethoxylated yields a typical analysis of:

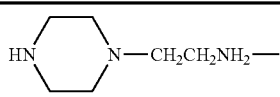

| aminoethyl piperazine: | 50% to 70% by weight |
| triethylene tetramine: | 40% maximum by weight |
| others: | balance. |

The dosages of the components of the strength improvement composition of admixtures, polycarboxylate high range water reducing dispersant, set retarder, and strength improvement additive, are governed by factors such as cement type and reactivity, ambient temperature, and concrete mixture proportions.

The hydraulic cement comprising the cementitious formulation is selected from the group consisting of portland cement, modified portland cement, or masonry cement, and mixtures thereof. By portland cement is meant all cementitious compositions which have a high content of tricalcium silicate and includes portland cement and cements that are chemically similar or analogous to portland cement, the specification for which is set forth in ASTM specification C 150-00.

Cementitious materials are materials that alone have hydraulic cementing properties, and set and harden in the presence of water. Included in cementitious materials are ground granulated blast-furnace slag, natural cement, hydraulic hydrated lime, and combinations of these and other materials.

Aggregate can be included in the cementitious formulation to provide for mortars which include fine aggregate, and concretes which also include coarse aggregate. The fine aggregate are materials that almost entirely pass through a Number 4 sieve (ASTM C 125 and ASTM C 33), such as silica sand. The coarse aggregate are materials that are predominantly retained on a Number 4 sieve (ASTM C 125 and ASTM C 33), such as silica, quartz, crushed round marble, glass spheres, granite, limestone, calcite, feldspar, alluvial sands, sands or any other durable aggregate, and mixtures thereof.

The cementitious composition described herein may contain other additives or ingredients and should not be limited to the stated formulations. Cement additives that can be added include, but are not limited to: set accelerators, air-entraining or air detraining agents, water reducers, corrosion inhibitors, pigments, wetting agents, water soluble polymers, strength enhancing agents, rheology modifying agents, water repellents, fibers, dampproofing admixtures, gas formers, permeability reducers, pumping aids, fungicidal admixtures, germicidal admixtures, insecticidal admixtures, finely divided mineral admixtures, alkali-reactivity reducer, bonding admixtures, shrinkage reducing admixtures, and any other admixture or additive that does not adversely affect the properties of the admixture of the present invention.

An accelerator that can be used in the admixture of the present invention can include, but is not limited to, a nitrate salt of an alkali metal, alkaline earth metal, or aluminum; a nitrite salt of an alkali metal, alkaline earth metal, or aluminum; a thiocyanate of an alkali metal, alkaline earth metal or aluminum; a thiosulphate of an alkali metal, alkaline earth metal, or aluminum; a hydroxide of an alkali metal, alkaline earth metal, or aluminum; a carboxylic acid salt of an alkali metal, alkaline earth metal, or aluminum (such as calcium formate); a halide salt of an alkali metal or alkaline earth metal (such as bromide), Examples of accelerators particularly suitable for use in the present invention include, but are not limited to, POZZOLITH® NC534, nonchloride type accelerator and/or RHEOCRETE® CNI calcium nitrite-based corrosion inhibitor both sold under the trademarks by Master Builders Inc. of Cleveland, Ohio.

The salts of nitric acid have the general formula $M(NO_3)_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

Nitrite salts have the general formula $M(NO_2)_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

The salts of the thiocyanic acid have the general formula $M(SCN)_b$, where M is an alkali metal, or an alkaline earth metal or aluminum, and where b is 1 for alkali metal salts, 2 for alkaline earth salts and 3 for aluminum salts. These salts are variously known as sulfocyanates, sulfocyanides, rhodanates or rhodanide salts. Preferred are thiocyanic acid salts of Na, K, Mg, Ca and Al.

The thiosulfate salts have the general formula $M_f(S_2O_3)_g$ where M is alkali metal or an alkaline earth metal or aluminum, and f is 1 or 2 and g is 1, 2 or 3, depending on the valencies of the M metal elements. Preferred are thiosulfate acid salts of Na, K, Mg, Ca and Al.

The carboxylic acid salts have the general formula RCOOM wherein R is H or $C_1$ to about $C_{10}$ alkyl, and M is alkali metal or an alkaline earth metal or aluminum. Preferred are carboxylic acid salts of Na, K, Mg, Ca and Al. A preferred carboxylic acid salt is calcium formate.

The term air entrainer includes any chemical that will entrain air in cementitious compositions. Air entrainers can also reduce the surface tension of a composition at low concentration. Air-entraining admixtures are used to purposely entrain microscopic air bubbles into concrete. Air-entrainment dramatically improves the durability of concrete exposed to moisture during cycles of freezing and thawing. In addition, entrained air greatly improves a concrete's resistance to surface scaling caused by chemical deicers. Air entrainment also increases the workability of fresh concrete while eliminating or reducing segregation and bleeding. Materials used to achieve these desired effects can be selected from wood resin, sulfonated lignin, petroleum acids, proteinaceous material, fatty acids, resinous acids, alkylbenzene sulfonates, sulfonated hydrocarbons, vinsol resin, anionic surfactants, cationic surfactants, nonionic surfactants, natural rosin, synthetic rosin, an inorganic air entrainer, synthetic detergents, and their corresponding salts, and mixtures thereof. Air entrainers are added in an amount to yield a desired level of air in a cementitious composition. Generally, the amount of air entrainers (about 5% to about 15% solids content) in a cementitious composition ranges from about 0.07 ml to about 3.9 ml per kilogram of dry cement. In one embodiment the dosage is about 0.33 ml to about 0.98 ml per kilogram of dry cement. Weight percentages of the primary active ingredient of the air entrainers, wherein the primary active ingredient in the air entrainer provides the desired effect i.e., entrainment of air in the cementitious composition, are about 0.001% to about 0.05%; based on the weight of dry cementitious material. But this can vary widely due to variations in materials, mix proportion, temperature, and mixing action. An air entrainer useful with the present admixture composition can be any known air entrainer for cement, including natural resin, synthetic resin, and mixtures thereof. Examples of air entrainers that can be utilized in the present invention include, but are not limited to MB AE 90, MB VR and MICRO AIR®, all available from Master Builders Inc. of Cleveland, Ohio.

Air detrainers are used to decrease the air content in the cementitious composition. Examples of air detrainers that can be utilized in the present invention include, but are not limited to tributyl phosphate, dibutyl phthalate, octyl alcohol, water-insoluble esters of carbonic and boric acid, acetylenic diols, ethylene oxide-propylene oxide block copolymers and silicones.

Corrosion inhibitors in concrete serve to protect embedded reinforcing steel from corrosion. The high alkaline nature of the concrete causes a passive and non-corroding protective oxide film to form on the steel. However, carbonation or the presence of chloride ions from deicers or seawater, together with oxygen can destroy or penetrate the film and result in corrosion. Corrosion-inhibiting admixtures chemically slow this corrosion reaction. The materials most commonly used to inhibit corrosion are calcium nitrite, sodium nitrite, sodium benzoate, certain phosphates or fluorosilicates, fluoroaluminates, amines, organic based water repelling agents, and related chemicals.

Dampproofing admixtures reduce the permeability of concrete that has low cement contents, high water-cement ratios, or a deficiency of fines in the aggregate portion. These admixtures retard moisture penetration into dry concrete and include certain soaps, stearates, and petroleum products.

Permeability reducers are used to reduce the rate at which water under pressure is transmitted through concrete. Silica fume, fly ash, ground slag, metakaolin, natural pozzolans, water reducers, and latex can be employed to decrease the permeability of the concrete.

Pumping aids are added to concrete mixes to improve pumpability. These admixtures thicken the fluid concrete, i.e., increase its viscosity, to reduce de-watering of the paste while it is under pressure from the pump. Among the materials used as pumping aids in concrete are organic and synthetic polymers, hydroxyethylcellulose (HEC) or HEC blended with dispersants, organic flocculents, organic emulsions of paraffin, coal tar, asphalt, acrylics, bentonite and pyrogenic silicas, natural pozzolans, fly ash and hydrated lime.

Bacteria and fungal growth on or in hardened concrete may be partially controlled through the use of fungicidal, germicidal, and insecticidal admixtures. The most effective materials for these purposes are polyhalogenated phenols, dialdrin emulsions, and copper compounds.

Finely divided mineral admixtures are materials in powder or pulverized form added to concrete before or during the mixing process to improve or change some of the plastic or hardened properties of portland cement concrete. Portland cement, as used in the trade, means a hydraulic cement produced by pulverizing clinker, comprising hydraulic calcium silicates, calcium aluminates, and calcium aluminoferrites, and usually containing one or more of the forms of calcium sulfate as an interground addition. Portland cements are classified in ASTM C 150 as Type I II, III, IV, or V. The finely divided mineral admixtures can be classified according to their chemical or physical properties as: cementitious materials; pozzolans; pozzolanic and cementitious materials; and nominally inert materials.

A pozzolan is a siliceous or aluminosiliceous material that possesses little or no cementitious value but will, in the presence of water and in finely divided form, chemically react with the calcium hydroxide produced during the hydration of portland cement to form materials with cementitious properties. Diatomaceous earth, opaline cherts, clays, shales, fly ash, silica fume, volcanic tuffs and pumicites are some of the known pozzolans. Certain ground granulated blast-furnace slags and high calcium fly ashes possess both pozzolanic and cementitious properties. Natural pozzolan is a term of art used to define the pozzolans that occur in nature, such as volcanic tuffs, pumices, trasses, diatomaceous earths, opaline, cherts, and some shales. Nominally inert materials can also include finely divided raw quartz, dolomites, limestones, marble, granite, and others. Fly ash is defined in ASTM C618.

Alkali-reactivity reducers can reduce the alkali-aggregate reaction and limit the disruptive expansion forces that this reaction can produce in hardened concrete. Pozzolans (fly ash, silica fume), blast-furnace slag, salts of lithium and barium are especially effective.

Bonding admixtures are usually added to portland cement mixtures to increase the bond strength between old and new concrete and include organic materials such as rubber, polyvinyl chloride, polyvinyl acetate, acrylics, styrene butadiene copolymers, and other powdered polymers.

Fresh concrete can sometimes be harsh because of faulty mixture proportions or certain aggregate characteristics such as particle shape and improper grading. Under these conditions, entrained air, which acts like a lubricant, can be used as a workability improving agent. Other workability agents include certain water reducing admixtures, some viscosity modifying admixtures and certain finely divided admixtures.

In the construction field, many methods of protecting concrete from tensile stresses and subsequent cracking have been developed through the years. One modern method involves distributing fibers throughout a fresh concrete mixture. Upon hardening, this concrete is referred to as fiber-reinforced concrete. Fibers can be made of zirconium materials, carbon, steel, fiberglass, or synthetic materials, e.g., polypropylene, nylon, polyethylene, polyester, rayon, high-strength aramid, or mixtures thereof.

The shrinkage reducing agent which can be used in the present invention can include but is not limited to RO$(AO)_{1-10}$H, wherein R is a $C_{1-5}$ alkyl or $C_{5-6}$ cycloalkyl radical and A is a $C_{2-3}$ alkylene radical, alkali metal sulfate, alkaline earth metal sulfates, alkaline earth oxides, preferably sodium sulfate and calcium oxide. TETRAGUARD® shrinkage reducing agent is preferred and is available from Master Builders Inc. of Cleveland, Ohio.

Natural and synthetic admixtures are used to color concrete for aesthetic and safety reasons. These coloring admixtures are usually composed of pigments and include carbon black, iron oxide, phthalocyanine, umber, chromium oxide, titanium oxide and cobalt blue.

Examples of inventive strength improvement admixture compositions were tested for the effect of their addition on the compressive strength and setting time of concrete mixtures.

Tables 1-9 show the effect of various retarder chemistries and strength improvement additive additions to cementitious mixtures containing polycarboxylate dispersant. Concrete mixture proportions for the examples were determined according to the guidelines outlined in ACI 211.1-91, Standard Practice for Selecting Proportions for Normal Weight Concrete. The mix design was based on a nominal cement content of 517 lb/yd$^3$ using a Type I portland cement (Tables 1, 3, 5, 6, and 8). Tables 2, 4, and 7 had 15% by weight of the Type I portland cement replaced with fly ash. Tests for slump (ASTM C 143), air content (ASTM C 231), compressive strength (ASTM C 39) and time of set (ASTM C 403) were performed in accordance with ASTM procedures.

Of particular interest was the effect on setting time and compressive strengths, both between the different set retarder chemistries at low and high levels and in the presence of the strength improvement admixture.

For Tables 1 and 2 each component was added separately to the mixer in a partial charge of mixing water prior to the batching of solid ingredients. Tributyl phosphate (TBP), or solubilized tributyl phosphate using an amine solubilizing agent in Table 2, were also added separately at 0.01%cwt so that air contents would be low (<3%) and similar. Tributyl phosphate or solubilized tributyl phosphate was added at 0.0096%cwt to mixtures in Table 2. Concrete materials were batched and mixed for 5 minutes.

TABLE 1

| | Sample | | | | | | | | | | |
|---|---|---|---|---|---|---|---|---|---|---|---|
| | S-1 | S-2 | S-3 | S-4 | S-5 | S-6 | S-7 | S-8 | S-9 | S-10 | S-11 |
| Cement (lbs/yd3) | 516 | 512 | 515 | 518 | 518 | 518 | 518 | 518 | 518 | 518 | 519 |
| Sand (lbs/yd3) | 1347 | 1386 | 1395 | 1403 | 1403 | 1404 | 1403 | 1403 | 1402 | 1402 | 1405 |
| Stone (lbs/yd3) | 1866 | 1922 | 1935 | 1946 | 1946 | 1947 | 1946 | 1946 | 1944 | 1944 | 1948 |
| Water (lbs/yd3) | 301 | 267 | 258 | 248 | 250 | 246 | 250 | 250 | 250 | 251 | 250 |
| Water/Cement | 0.583 | 0.521 | 0.501 | 0.479 | 0.483 | 0.475 | 0.483 | 0.483 | 0.483 | 0.485 | 0.482 |
| Sand/Aggregate | 0.43 | 0.43 | 0.43 | 0.43 | 0.43 | 0.43 | 0.43 | 0.43 | 0.43 | 0.43 | 0.43 |
| % Water Reduction | | 11.30 | 14.29 | 17.61 | 16.94 | 18.27 | 16.94 | 16.94 | 16.94 | 16.61 | 16.94 |
| PC disp (% cwt) | | 0.10 | 0.10 | 0.10 | 0.10 | 0.10 | 0.10 | 0.10 | 0.10 | 0.10 | 0.10 |
| Polysaccharide (% cwt) | — | 0.05 | 0.08 | — | — | — | — | — | — | 0.05 | — |
| Na Gluconate/ Gluconic Acid (% cwt) | — | — | — | 0.04 | 0.06 | — | — | — | — | — | 0.04 |
| Gluconic Acid (% cwt) | — | — | — | — | — | 0.04 | 0.06 | — | — | — | — |
| SIA (% cwt) | — | — | — | — | — | — | — | 0.04 | 0.04 | 0.04 | |
| Slump (in) | 5.00 | 4.00 | 6.25 | 4.00 | 7.00 | 4.00 | 4.00 | 6.75 | 2.75 | 6.75 | 6.25 |
| % Air | 2.0 | 2.0 | 2.0 | 2.1 | 2.0 | 2.2 | 2.0 | 2.0 | 2.1 | 2.0 | 1.9 |
| Initial Set Time (hrs) | 4.50 | 4.42 | 5.75 | 7.08 | 6.08 | 6.83 | 6.17 | 7.92 | 4.72 | 5.58 | 6.25 |
| Compressive Strength | | | | | | | | | | | |
| 1 Day | 1540 | 2260 | 2330 | 2440 | 2410 | 2640 | 2570 | 2340 | 2500 | 2540 | 2440 |
| 7 day | 3540 | 4440 | 4950 | 5310 | 5190 | 5430 | 5170 | 5150 | 5450 | 5560 | 5950 |
| 28 Day | 5000 | 5980 | 5740 | 6810 | 6520 | 6790 | 6610 | 6720 | 6950 | 7320 | 7890 |

PC Disp - polycarboxylate dispersant
SIA - strength improvement additive

Table 1 shows the setting time and late age compressive strength (28 Day) effect of three commonly used set retarder chemistries: a polysaccharide mixture, a hydroxycarboxylic acid, and a 65:35 blend of sodium gluconate/ hydroxycarboxylic acid on concrete mixtures. In samples S-3 to S-8 the set retarders were used at a low (0.04-0.05%cwt) and a high level (0.06-0.08%cwt) in combination with a polycarboxylate dispersant. For all of the concrete mixtures in the table, the polycarboxylate dispersant level was held constant at 0.1% by cement weight. In samples S-3 to S-8, both setting time and 28 day compressive strength were found to increase as the set retarder level increased (mixes S-3 vs. S-4, S-5 vs. S-6, S-7 vs. S-8) and except for the sample (S-3) with the low level of polysaccharide, all of the concrete mixtures had retarded setting times and higher compressive strengths relative to the polycarboxylate dispersant only reference (S-2). The concrete mixture containing the strength improvement additive (SIA) as the only addition to the polycarboxylate dispersant (S-9) also showed a slight increase in setting time and an increase in compressive strength relative to the polycarboxylate dispersant only concrete mixture. An unexpected additional increase in compressive strength over the polycarboxylate dispersant plus set retarder concrete mixtures (S-3 to S-8) or polycarboxylate dispersant plus strength improvement combination (S-9) was found for the three component combination (S-10 and S-11) of polycarboxylate dispersant, strength improvement additive and low levels of either the polysaccharide or sodium gluconate/hydroxycarboxylic blend. The increase in compressive strength of the concrete mixtures containing the three components (polycarboxylate dispersant, strength improvement additive, and set retarder) was observed with only a small change in setting time relative to the polycarboxylate dispersant plus set retarder (S-10 vs. S-3 and S-11 vs. S-5 and S-7). The results demonstrate that the increase in compressive strength is the result of a chemical effect on cement hydration and is not the result of improved water reduction (decrease in water to cement ratio).

TABLE 2

|  | Sample | | | | | | | |
| --- | --- | --- | --- | --- | --- | --- | --- | --- |
|  | S-12 | S-13 | S-14 | S-15 | S-16 | S-17 | S-18 | S-19 |
| Cement (lbs/yd3) | 445 | 441 | 439 | 443 | 444 | 443 | 444 | 444 |
| Class F ash (lbs/yd3) | 80 | 79 | 79 | 79 | 80 | 80 | 80 | 80 |
| Sand (lbs/yd3) | 1357 | 1381 | 1373 | 1385 | 1388 | 1387 | 1390 | 1390 |
| Stone (lbs/yd3) | 1882 | 1913 | 1902 | 1918 | 1923 | 1921 | 1925 | 1925 |
| Water (lbs/yd3) | 293 | 262 | 260 | 260 | 256 | 252 | 253 | 253 |
| Water/Cement | 0.558 | 0.504 | 0.502 | 0.498 | 0.489 | 0.482 | 0.483 | 0.483 |
| Sand/Aggregate | 0.43 | 0.43 | 0.43 | 0.43 | 0.43 | 0.43 | 0.43 | 0.43 |
| PC Disp (% cwt) | — | 0.08 | 0.08 | 0.08 | 0.08 | 0.08 | 0.08 | 0.08 |
| Solubilized TBP (% cwt) | — | — | 0.0096 | — | — | — | — | — |
| TBP (% cwt) | — | 0.0096 | — | 0.0096 | 0.0096 | 0.0096 | 0.0096 | 0.0096 |
| Polysaccharide (% cwt) | — | — | — | 0.040 | — | — | 0.040 | — |
| Na Gluconate/Gluconic Acid (% cwt) | — | — | — | — | 0.032 | — | — | 0.032 |
| SIA (% cwt) | — | — | — | — | — | 0.032 | 0.032 | 0.032 |
| Slump (in) | 7.00 | 7.00 | 6.75 | 8.00 | 7.75 | 7.25 | 7.75 | 8.00 |
| % Air | 1.3 | 2.0 | 2.6 | 1.9 | 1.9 | 2.2 | 2.0 | 2.0 |
| Initial Set Time (hrs) | 5.33 | 5.58 | 5.75 | 6.67 | 6.83 | 5.75 | 6.75 | 7.17 |
| Compressive Strength | | | | | | | | |
| 1 Day | 1140 | 1740 | 1800 | 1740 | 1750 | 1730 | 1750 | 1760 |
| 7 Day | 2680 | 3650 | 3700 | 3870 | 4090 | 4070 | 4410 | 4350 |
| 28 Day | 3940 | 5000 | 4900 | 5400 | 5580 | 6050 | 6280 | 6470 |

PC Disp—polycarboxylate dispersant
SIA—strength improvement additive
TBP—tributyl phosphate Table 2 contains concrete mixtures where 15% (by weight) of cement was replaced with fly ash and shows similar comparisons of polycarboxylate dispersant only compared to combinations of polycarboxylate dispersant and set retarder, polycarboxylate dispersant and strength improvement additive, and polycarboxylate dispersant in combination with strength improvement additive and a set retarder. The levels of each component in the concrete mixtures were lower but proportional to the concrete mixtures in Table 1. Similar to the results in Table 1, an unexpected increase in compressive strength with only a small change in setting time was observed for the three component combination compared to the polycarboxylate dispersant plus set retarder or strength improvement additive concrete mixtures (mixes S-15 vs. S-18 and S-16 vs. S-19).

In Tables 3 and 4 admixture solutions were first prepared containing all of the components to be tested (polycarboxylate dispersant, strength improvement additive, solubilized tributyl phosphate, and/or set retarder). This solution was added up front to the concrete mixtures with a partial charge of mixing water. The level of tributyl phosphate in solutions shown in Table 3 is proportional (by weight of polycarboxylate dispersant) to that shown in Tables 1 and 2. The tributyl phosphate level for solutions shown in Table 4 is approximately 33% lower (by weight of polycarboxylate dispersant) to that shown in Tables 1 and 2.

TABLE 3

| | Sample | | | | | | | | |
|---|---|---|---|---|---|---|---|---|---|
| | S-20 | S-21 | S-22 | S-23 | S-24 | S-25 | S-26 | S-27 | S-28 |
| Cement (lbs/yd3) | 522 | 512 | 518 | 518 | 516 | 509 | 507 | 507 | 509 |
| Sand (lbs/yd3) | 1347 | 1340 | 1357 | 1355 | 1351 | 1383 | 1377 | 1378 | 1384 |
| Stone (lbs/yd3) | 1887 | 1876 | 1900 | 1897 | 1892 | 1936 | 1928 | 1930 | 1938 |
| Water (lbs/yd3) | 307 | 287 | 268 | 277 | 284 | 240 | 239 | 239 | 257 |
| Water/Cement | 0.588 | 0.561 | 0.517 | 0.535 | 0.550 | 0.472 | 0.471 | 0.471 | 0.505 |
| Sand/Aggregate | 0.43 | 0.43 | 0.43 | 0.43 | 0.43 | 0.43 | 0.43 | 0.43 | 0.43 |
| % Water Reduction | — | 6.51 | 12.70 | 9.77 | 7.49 | 21.82 | 22.15 | 22.15 | 16.29 |
| PC Disp | — | 0.034 | 0.034 | 0.034 | 0.034 | 0.1021 | 0.1021 | 0.1021 | 0.100 |
| Na Gluconate/Gluconic Acid (% cwt) | — | — | 0.0088 | 0.0044 | 0.0088 | 0.0265 | 0.0133 | 0.0265 | — |
| Gluconic Acid (% cwt) | — | — | 0.0155 | 0.0024 | 0.0048 | 0.0460 | 0.0071 | 0.0143 | — |
| SIA (% cwt) | — | — | 0.0136 | 0.0068 | 0.0136 | 0.0408 | 0.0204 | 0.0408 | — |
| Slump (in) | 7.50 | 7.25 | 7.50 | 7.50 | 7.00 | 7.50 | 7.75 | 7.75 | 7.00 |
| % Air | 1.1 | 2.9 | 3.0 | 2.6 | 2.4 | 3.5 | 3.9 | 3.8 | 2.4 |
| Initial Set Time | 5.0 | 5.6 | 5.8 | 6.3 | 5.5 | 10.8 | 5.9 | 6.4 | 5.4 |
| Compressive Strength | | | | | | | | | |
| 1 day | 1530 | 1910 | 2030 | 1800 | 2200 | 2130 | 2720 | 2560 | 2350 |
| 7 day | 3500 | 3990 | 4510 | 4100 | 4770 | 5850 | 5250 | 5600 | 4660 |
| 28 day | 4840 | 5220 | 5780 | 5390 | 6070 | 7270 | 6530 | 7160 | 5830 |

PC Disp - polycarboxylate dispersant
SIA - strength improvement additive

Table 3 shows setting time and strength data for different blend ratios of sodium gluconate/hydroxycarboxylic acid set retarders in combination with the strength improvement additive and polycarboxylate dispersant compared to polycarboxylate dispersant alone. The sodium gluconate/hydroxycarboxylic acid blend ratios are 23.5:76.5 (S-22) and 42:58 (S-23 and S-24). The results show that with a low level of polycarboxylate dispersant, all of the three component combinations of set retarder/strength improvement additive/polycarboxylate dispersant gave higher 28 day compressive strengths with minimal change in setting time versus the polycarboxylate dispersant only reference (mixes S-22, S-23, S-24 vs. S-21). At the higher polycarboxylate dispersant level, the concrete mixture containing the highest level of gluconic acid (S-25) showed an increase in setting time as well as a compressive strength increase relative to the polycarboxylate dispersant only reference (S-28). The other concrete mixtures having the three component combination (S-26 and S-27) showed an increase in compressive strength with a minimal change in setting time compared to the polycarboxylate only reference (S-28).

TABLE 4

| | Sample | | | | | | | | | | |
|---|---|---|---|---|---|---|---|---|---|---|---|
| | S-29 | S-30 | S-31 | S-32 | S-33 | S-34 | S-35 | S-36 | S-37 | S-38 | S-39 |
| Cement (lbs/yd3) | 439 | 435 | 434 | 434 | 435 | 435 | 434 | 434 | 434 | 434 | 434 |
| Class F Ash (lbs/yd3) | 79 | 78 | 78 | 78 | 78 | 78 | 78 | 78 | 78 | 78 | 78 |
| Sand (lbs/yd3) | 1400 | 1402 | 1401 | 1399 | 1402 | 1402 | 1425 | 1426 | 1427 | 1425 | 1426 |
| Stone (lbs/yd3) | 1808 | 1812 | 1810 | 1809 | 1812 | 1812 | 1841 | 1842 | 1843 | 1841 | 1842 |
| Water (lbs/yd3) | 316 | 296 | 296 | 290 | 292 | 290 | 279 | 274 | 271 | 269 | 271 |
| Water/Cement | 0.610 | 0.577 | 0.578 | 0.566 | 0.569 | 0.565 | 0.545 | 0.535 | 0.529 | 0.525 | 0.529 |
| Sand/Aggregate | 0.45 | 0.45 | 0.45 | 0.45 | 0.45 | 0.45 | 0.45 | 0.45 | 0.45 | 0.45 | 0.45 |
| % Water Reduction | — | 6.33 | 6.33 | 8.23 | 7.59 | 8.23 | 11.71 | 13.29 | 14.24 | 14.87 | 14.24 |
| PC Disp | — | 0.037 | 0.037 | 0.037 | 0.037 | 0.037 | 0.100 | 0.100 | 0.100 | 0.100 | 0.100 |
| Polysaccharide (% cwt) | — | — | — | — | — | 0.0088 | — | — | — | — | 0.0265 |
| Gluconic Acid (% cwt) | — | — | 0.0133 | 0.0133 | 0.0133 | 0.0048 | — | 0.0400 | 0.0400 | 0.0400 | 0.0143 |
| SIA | — | — | — | 0.0133 | 0.0083 | 0.0133 | — | — | 0.0400 | 0.0250 | 0.0400 |
| Slump (in) | 6.00 | 5.00 | 6.50 | 6.00 | 6.50 | 5.75 | 6.25 | 7.00 | 6.50 | 7.00 | 5.75 |
| % Air | 1.1 | 2.2 | 2.3 | 2.7 | 2.5 | 2.6 | 2.1 | 2.4 | 2.5 | 2.7 | 2.5 |
| Initial Set (hrs) | 5.8 | 6.1 | 6.6 | 6.5 | 6.4 | 6.7 | 6.3 | 8.6 | 9.0 | 9.0 | 8.3 |
| Compressive Strength | | | | | | | | | | | |
| 1 Day | 1060 | 1230 | 1160 | 1310 | 1270 | 1260 | 1550 | 1240 | 1180 | 1270 | 1170 |
| 7 Day | 2930 | 3240 | 3170 | 3310 | 3330 | 3200 | 3590 | 3320 | 3820 | 3960 | 3950 |
| 28 Day | 4250 | 4640 | 4430 | 5050 | 4930 | 4920 | 5200 | 4890 | 5750 | 5980 | 5970 |

PC Disp - polycarboxylate dispersant
SIA - strength improvement additive

Table 4 contains concrete mixtures where 15% (by weight) of cement was replaced with fly ash and shows comparisons of polycarboxylate dispersant only to combinations of polycarboxylate dispersant and set retarder and polycarboxylate dispersant, set retarder and strength improvement additive. At the low polycarboxylate dispersant level, the three component combination of polycarboxylate dispersant, strength improvement additive and set retarder (S-32, S-33, S-34) showed an increase in compressive strength with only a small change in setting time compared to the polycarboxylate dispersant only reference (S-30). No difference in setting time was observed for the three component combination (S-32, S-33, S-34) as compared to the polycarboxylate dispersant plus set retarder (S-31). At the high polycarboxylate dispersant level, mixtures containing the three component combination (S-37, SS-38, S-39), showed increased compressive strength and minimal change in setting time relative to the polycarboxylate dispersant plus set retarder concrete mixture (S-36).

For Tables 5, 6, 7, 8 and 9 each component was added separately to the mixer in a partial charge of mixing water prior to the batching of solid ingredients. Tributyl phosphate (TBP) was also added separately at 0.0005%cwt to the mixtures in Table 5 so that air contents would be low (<3%) and similar. Concrete materials were batched and mixed for 5 minutes.

increasing levels of SIA. Relative to the polycarboxylate only reference (S-41), addition of set retarder (S-42 and S-46) increased 28-day compressive strengths. Samples S-43 to S-45 show an increase in 28-day compressive strength over the polycarboxylate plus set retarder (S-42 and S-46) without any change in setting time. Samples S-43 to S-45 demonstrate that increasing amounts of SIA produced increasing compressive strength in the cementitious mixtures. Samples S-47 to S-49 also show an increase in compressive strength for the three component combination of polycarboxylate, PA set retarder and SIA with a slight reduction in setting time. Similar to the results shown in Table 1, the increase in compressive strength appears to be the result of a chemical effect on cement hydration and is not the result of improved water reduction (decrease in water to cement ratio).

The examples shown in Tables 6 and 7 demonstrate the synergy of a set retarder plus SIA in combination with a polycarboxylate compared to other dispersant types such as lignosulfonate and sulfonated naphthalene formaldehyde condensate (BNS). The mixtures in Table 6 use portland cement while Table 7 contains concrete mixtures where 15% (by weight) of cement was replaced with fly ash. In Table 6, each dispersant level was selected to provide the same level of water-reduction and mix water contents were held constant for each mixture where set retarder or SIA was additionally added. TBP was added to the BNS and polycarboxylate mix-

TABLE 5

| | Sample | | | | | | | | | |
|---|---|---|---|---|---|---|---|---|---|---|
| | S-40 | S-41 | S-42 | S-43 | S-44 | S-45 | S-46 | S-47 | S-48 | S-49 |
| Cement (lbs/yd3) | 518 | 515 | 515 | 518 | 517 | 517 | 517 | 516 | 518 | 515 |
| Sand (lbs/yd3) | 1350 | 1377 | 1377 | 1384 | 1382 | 1383 | 1383 | 1379 | 1382 | 1378 |
| Stone (lbs/yd3) | 1850 | 1887 | 1887 | 1897 | 1894 | 1896 | 1896 | 1891 | 1893 | 1889 |
| Water (lbs/yd3) | 306 | 269 | 269 | 271 | 265 | 265 | 265 | 269 | 265 | 268 |
| % Water Reduction | | 12.09 | 12.09 | 11.44 | 13.40 | 13.40 | 13.40 | 12.09 | 13.40 | 12.42 |
| PC Disp (% cwt) | | 0.080 | 0.080 | 0.080 | 0.080 | 0.080 | 0.080 | 0.080 | 0.080 | 0.080 |
| HA (% cwt) | | | 0.020 | 0.020 | 0.020 | 0.020 | | | | |
| PA (% cwt) | | | | | | | 0.010 | 0.010 | 0.010 | 0.010 |
| SIA (% cwt) | | | | 0.010 | 0.020 | 0.040 | | 0.010 | 0.020 | 0.040 |
| TBP (% cwt) | | 0.005 | 0.005 | 0.005 | 0.005 | 0.005 | 0.005 | 0.005 | 0.005 | 0.005 |
| Slump (in) | 7.50 | 7.25 | 7.75 | 8.00 | 7.25 | 8.00 | 7.75 | 8.00 | 7.50 | 8.00 |
| % Air | 1.8 | 2.6 | 2.6 | 2.1 | 2.6 | 2.5 | 2.5 | 2.5 | 2.6 | 2.6 |
| Initial Set Time (Hrs.) | 5.08 | 5.67 | 6.67 | 6.67 | 6.58 | 6.50 | 7.00 | 6.75 | 6.50 | 6.75 |
| Compressive Strength | | | | | | | | | | |
| 7 Day | 3870 | 4360 | 4880 | 4730 | 5110 | 5160 | 4840 | 3910 | 5080 | 5100 |
| 28 Day | 5170 | 6020 | 6360 | 6570 | 7040 | 7490 | 6390 | 6680 | 6960 | 6660 |

PC Disp - polycarboxylate dispersant
SIA - strength improvement additive
TBP - tributyl phosphate
HA - alpha hydroxycarboxylic acid
PA - phosphonic acid salt Table 5 shows the setting time and late age compressive strength (28 day) effect of two other commonly used retarder chemistries: alpha hydroxycarboxylic acid, and a phosphonic acid salt on concrete mixtures. For all of the concrete mixtures in the table, the polycarboxylate dispersant level was held constant at 0.08% by cement weight and the level of each set retarder was selected to retard setting times by approximately 1.5 to 2.0 hours. Samples S-42 and S-46 show each of the set retarders in combination with a polycarboxylate dispersant and samples S-43 to S-45 and S-47 to S-49 show the combination of polycarboxylate dispersant and HA set retarder with tures to keep air contents below 2.5%. The level of set retarder and SIA in these examples was fixed at 0.03% by cement weight. In Table 7, each dispersant level was lowered relative to those in Table 6 in order to maintain the same level of water reduction with the portland cement plus fly ash mixture. Mix water contents were held constant for each mixture where set retarder or SIA was additionally added. TBP was added to the BNS and polycarboxylate mixtures to keep air contents below 2.5%. The proportion of set retarder to the dispersant in Table 7 is the same as in Table 6 and the SIA in these examples was fixed at 0.035% by cement weight.

Samples S-60 to S-62 in Table 6, show the setting times and compressive strength for calcium BNS, sodium lignosulfonate and polycarboxylate dispersants and samples S-51 to S-53 show each dispersant with added set retarder. Relative to their respective dispersant only references, the addition of set retarder shows 28-day compressive strengths were the same or slightly reduced and setting times were increased by approximately one hour for the polycarboxylate dispersant, and two hours for the BNS and lignosulfonate. Samples S-57 to S-59 show each dispersant with added SIA. Relative to their respective references, the addition of SIA shows 28-day compressive strengths were increased and some increase in setting time was observed for the BNS and lignosulfonate dispersants. Samples S-54 to S-56 show each dispersant with both set retarder and SIA additions. With the BNS dispersant, 28-day compressive strengths were the same as those with SIA only and setting time increased an additional one-hour relative to the BNS plus retarder combination. With the lignosulfonate dispersant, 28-day compressive strengths were lower than those with SIA only and the setting time increased approximately one hour relative to the lignosulfonate dispersant plus retarder combination. For the polycarboxylate dispersant, a significant increase in 28-day compressive strengths was observed relative to the polycarboxylate plus retarder or polycarboxylate plus SIA without a significant change in setting time.

TABLE 6

| | S-50 | S-51 | S-52 | S-53 | S-54 | S-55 | S-56 |
|---|---|---|---|---|---|---|---|
| Cement (lbs/yd3) | 518 | 517 | 519 | 519 | 517 | 518 | 519 |
| Sand (lbs/yd3) | 1350 | 1386 | 1393 | 1393 | 1387 | 1388 | 1393 |
| Stone (lbs/yd3) | 1852 | 1900 | 1909 | 1910 | 1902 | 1904 | 1910 |
| Water (lbs/yd3) | 310 | 268 | 261 | 269 | 268 | 260 | 269 |
| % Water Reduction | | 13.55 | 15.81 | 13.23 | 13.55 | 16.13 | 13.23 |
| Lignosulfonate (% cwt) | | 0.280 | | | 0.280 | | |
| BNS (% cwt) | | | 0.430 | | | 0.430 | |
| PC Disp (% cwt) | | | | 0.110 | | | 0.110 |
| Na Gluconate/G.A. (% cwt) | | 0.030 | 0.030 | 0.030 | 0.030 | 0.030 | 0.030 |
| SIA (% cwt) | | | | | 0.030 | 0.030 | 0.030 |
| TBP (% cwt) | | 0.005 | | 0.010 | 0.005 | | 0.010 |
| Slump (in) | 8.00 | 6.75 | 8.00 | 8.00 | 5.75 | 8.00 | 8.25 |
| % Air | 1.5 | 2.2 | 2.2 | 1.7 | 2.1 | 2.5 | 1.7 |
| Initial Set (Hrs.) | 4.75 | 9.92 | 7.83 | 6.50 | 11.00 | 8.67 | 6.83 |
| Compressive Strength | | | | | | | |
| 7 Day | 3890 | 4770 | 4710 | 4790 | 5120 | 5460 | 5070 |
| 28 Day | 4860 | 6040 | 5670 | 5850 | 6730 | 6210 | 6770 |

| | S-57 | S-58 | S-59 | S-60 | S-61 | S-62 |
|---|---|---|---|---|---|---|
| Cement (lbs/yd3) | 515 | 517 | 519 | 516 | 517 | 520 |
| Sand (lbs/yd3) | 1382 | 1387 | 1393 | 1383 | 1387 | 1394 |
| Stone (lbs/yd3) | 1894 | 1902 | 1910 | 1896 | 1902 | 1912 |
| Water (lbs/yd3) | 267 | 260 | 269 | 267 | 260 | 269 |
| % Water Reduction | 13.87 | 16.13 | 13.23 | 13.87 | 16.13 | 13.23 |
| Lignosulfonate (% cwt) | 0.280 | | | 0.280 | | |
| BNS (% cwt) | | 0.430 | | | 0.430 | |
| PC Disp (% cwt) | | | 0.110 | | | 0.110 |
| Na Gluconate/G.A. (% cwt) | | | | | | |
| SIA (% cwt) | 0.030 | 0.030 | 0.030 | | | |
| TBP (% cwt) | 0.005 | | 0.010 | 0.005 | | 0.010 |
| Slump (in) | 4.50 | 8.00 | 8.00 | 4.50 | 6.00 | 8.00 |
| % Air | 2.5 | 2.6 | 1.7 | 2.4 | 2.6 | 1.6 |
| Initial Set (Hrs.) | 8.17 | 6.33 | 5.67 | 7.83 | 5.67 | 5.42 |
| Compressive Strength | | | | | | |
| 7 Day | 5320 | 4900 | 5180 | 4650 | 4680 | 4620 |
| 28 Day | 6840 | 6470 | 6270 | 6120 | 5960 | 5900 |

BNS—napthalene sulfonate
PC Disp—polycarboxylate dispersant
SIA—strength improvement additive
TBP—tributyl phosphate
Na Gluconate/G.A.—sodium gluconate gluconic acid blend

TABLE 7

| | Sample | | | | | | |
|---|---|---|---|---|---|---|---|
| | S-63 | S-64 | S-65 | S-66 | S-67 | S-68 | S-69 |
| Cement (lbs/yd3) | 517 | 510 | 515 | 511 | 510 | 513 | 511 |
| Class F Ash (lbs/yd3) | 81 | 80 | 81 | 80 | 80 | 80 | 80 |
| Sand (lbs/yd3) | 1309 | 1343 | 1354 | 1344 | 1343 | 1350 | 1344 |
| Stone (lbs/yd3) | 1788 | 1833 | 1848 | 1835 | 1833 | 1843 | 1835 |
| Water (lbs/yd3) | 330 | 281 | 284 | 281 | 281 | 283 | 281 |
| % Water Reduction | | 14.85 | 13.94 | 14.85 | 14.85 | 14.24 | 14.85 |
| Sodium Lignin (% cwt) | | 0.242 | | | 0.242 | | |
| BNS (% cwt) | | | 0.346 | | | 0.346 | |
| PC Disp (% cwt) | | | | 0.095 | | | 0.095 |
| Na Gluc/G.A (% cwt) | | 0.026 | 0.026 | 0.026 | 0.026 | 0.026 | 0.026 |
| SIA (% cwt) | | | | | 0.035 | 0.035 | 0.035 |
| TBP (% cwt) | | 0.0043 | | 0.0086 | 0.0043 | | 0.0086 |
| Slump (in) | 7.25 | 7.00 | 8.00 | 7.75 | 7.25 | 8.00 | 8.00 |
| % Air | 0.9 | 2.2 | 1.4 | 2.1 | 2.2 | 1.7 | 2.1 |
| Initial Set (Hrs.) | 5.83 | 10.25 | 7.75 | 6.50 | 10.67 | 8.75 | 6.58 |
| Compressive Strength | | | | | | | |
| 7 Day | 3950 | 4500 | 4600 | 4500 | 4740 | 4880 | 5190 |
| 28 Day | 5420 | 5980 | 5990 | 6180 | 6650 | 6540 | 6990 |

| | Sample | | | | | |
|---|---|---|---|---|---|---|
| | S-70 | S-71 | S-72 | S-73 | S-74 | S-75 |
| Cement (lbs/yd3) | 510 | 512 | 510 | 510 | 514 | 510 |
| Class F Ash (lbs/yd3) | 80 | 80 | 80 | 80 | 80 | 80 |
| Sand (lbs/yd3) | 1341 | 1347 | 1341 | 1341 | 1351 | 1341 |
| Stone (lbs/yd3) | 1831 | 1839 | 1831 | 1831 | 1845 | 1831 |
| Water (lbs/yd3) | 281 | 282 | 281 | 281 | 283 | 281 |
| % Water Reduction | 14.85 | 14.55 | 14.85 | 14.85 | 14.24 | 14.85 |
| Sodium Lignin (% cwt) | 0.242 | | | 0.242 | | |
| BNS (% cwt) | | 0.346 | | | 0.346 | |
| PC Disp (% cwt) | | | 0.095 | | | 0.095 |
| Na Gluc/G.A (% cwt) | | | | | | |
| SIA (% cwt) | 0.035 | 0.035 | 0.035 | | | |
| TBP (% cwt) | 0.0043 | | 0.0086 | 0.0043 | | 0.0086 |
| Slump (in) | 7.50 | 7.75 | 7.00 | 7.25 | 8.00 | 7.50 |
| % Air | 2.3 | 1.9 | 2.3 | 2.3 | 1.6 | 2.3 |
| Initial Set (Hrs.) | 9.50 | 6.83 | 5.42 | 8.83 | 6.00 | 5.42 |

TABLE 7-continued

| Compressive Strength | | | | | | |
|---|---|---|---|---|---|---|
| 7 Day | 5080 | 4980 | 5180 | 4490 | 4470 | 4480 |
| 28 Day | 6910 | 6860 | 6830 | 5910 | 5870 | 6060 |

BNS - napthalene sulfonate
PC Disp - polycarboxylate dispersant
SIA - strength improvement additive
TBP - tributyl phosphate
Na Gluc/G.A. - sodium gluconate gluconic acid blend The comparative examples in Table 7 demonstrate the same performance trends with the portland cement plus fly ash mixtures as observed in Table 6. Relative to their respective dispersant only references (S-73 to S-75), samples S-64 to S-66, dispersant with added set retarder, show 28-day compressive strengths were the same and setting times were increased by approximately one hour for the samples containing polycarboxylate, and 1.5 hours for the BNS and lignosulfonate. Samples 15 S-70 to S-72 show cementitious mixtures containing each dispersant type (polycarboxylate, BNS and lignosulfonate) with added SIA. Relative to their respective references, 28-day compressive strengths increased and some increase in setting time was observed for the samples containing BNS and lignosulfonate dispersants.

Samples S-67 to S-69 are mixtures containing the dispersant types with both set retarder and SIA additions. S-68, with the BNS dispersant, had 28-day compressive strengths that were lower than those of S-71 with BNS and SIA only and setting time increased an additional one hour relative to the BNS, plus retarder combination of S-65. With the lignosulfonate dispersant, 28-day compressive strengths were lower than those with SIA (S-70) only and the setting time increased approximately one hour relative to the lignosulfonate dispersant plus retarder combination of S-64. For the polycarboxylate dispersant, 28-day compressive strengths were increased relative to S-66 polycarboxylate plus retarder or S-71 polycarboxylate plus SIA without a significant change in setting time.

Mixtures in Table 8 were prepared using combinations of a polycarboxylate dispersant, a set retarder, SIA and solubilized TBP with an amine solubilizing agent. These combinations were added to the concrete at low, medium, and high dosage levels where the high level was selected to impart a high degree of set retardation. A commercially available set accelerating admixture, NC534 from Master Builders, was additionally added at 15 fl.oz./cwt. with the low and medium example levels and at 30 fl.oz./cwt with the medium and high example levels. Of interest was the effect of reducing or eliminating set retardation and the influence on late age compressive strength.

TABLE 8

| | Sample | | | | | | | |
|---|---|---|---|---|---|---|---|---|
| | S-76 | S-77 | S-78 | S-79 | S-80 | S-81 | S-82 | S-83 |
| Cement (lbs/yd3) | 517 | 519 | 516 | 514 | 515 | 516 | 517 | 515 |
| Sand (lbs/yd3) | 1356 | 1407 | 1390 | 1370 | 1387 | 1375 | 1402 | 1387 |
| Stone (lbs/yd3) | 1867 | 1934 | 1913 | 1887 | 1909 | 1893 | 1928 | 1909 |
| Water (lbs/yd3) | 305 | 248 | 256 | 266 | 255 | 267 | 247 | 255 |
| % Water Reduction | | 18.69 | 16.07 | 12.79 | 16.39 | 12.46 | 19.02 | 16.39 |
| PC Disp (% cwt) | | 0.162 | 0.122 | 0.081 | 0.122 | 0.081 | 0.162 | 0.122 |
| Na Gluconate/G.A (% cwt) | | 0.056 | 0.042 | 0.028 | 0.042 | 0.028 | 0.056 | 0.042 |
| SIA (% cwt) | | 0.034 | 0.026 | 0.017 | 0.026 | 0.017 | 0.034 | 0.026 |
| TBP (% cwt) | | 0.014 | 0.011 | 0.007 | 0.011 | 0.007 | 0.014 | 0.011 |
| Pozzolith NC 534 (fl.oz/cwt) | | | | | 15 | 15 | 30 | 30 |
| Slump (in) | 6.00 | 7.00 | 6.75 | 6.25 | 6.75 | 7.00 | 7.00 | 7.00 |
| % Air | 1.5 | 2.3 | 2.7 | 3.1 | 2.9 | 2.8 | 2.6 | 2.9 |
| Initial Set (Hrs.) | 5.67 | 9.58 | 8.58 | 7.25 | 6.50 | 5.50 | 6.17 | 5.42 |
| Compressive Strength | | | | | | | | |
| 7 Day | 4130 | 6070 | 5570 | 5100 | 5980 | 5390 | 6310 | 5970 |
| 28 Day | 5470 | 7660 | 7220 | 7120 | 7680 | 7520 | 7760 | 7170 |

PC Disp - polycarboxylate dispersant
SIA - strength improvement additive
TBP - tributyl phosphate
Na Gluconate/G.A. - sodium gluconate gluconic acid blend In Table 8, samples S-77 to S79 show the 28 day compressive strength response and increasing amount of retardation relative to the reference (S-76) as the amounts of polycarboxylate, set retarder, SIA combination increased from low to high in the mixtures. For the mid (S-80) and low levels (S-81) of the example combination (polycarboxylate, set retarder, SIA), the 15 fl.oz./cwt dosage of accelerator reduced the initial set time (amount of retardation), as compared to the initial set time of S-76, from 3 hours to 1 hour for the mid level (S-78 vs. S-80) and from 1.5 hours to slightly accelerated for the low level of the example combination 15 (S-79 vs. S-81). In both cases (S-80 and S-81), 28-day compressive strengths increased with the addition of accelerator. For the mid (S-83) and high (S-82) levels of the example combination, the 30 fl.oz./cwt dosage of accelerator reduced the initial set time (amount of retardation) as compared to S-76 from about 4 hours (S-77) to one-half hour (S-82) for the high level and from 3 hours (S-78) to slightly accelerated (S-83) for the mid level of the example combination. In both the high (S-77 and S-82) and the mid level (S-78 and S-83) samples, 28-day compressive strengths were equivalent showing that the good compressive strength performance observed for the three component combination are not a result of increased setting time.

In another example of a strength improvement additive that has been found to be useful in the present invention are poly(hydroxyalkyl)amines such as triisopropanolamine. Table 9 shows the comparison of two different strength improvement additives, a tetrahydroxyethylethylenediamine and triisopropanolamine in combination with a polycarboxylate dispersant and set retarder. For all of the concrete mixtures in the table, the polycarboxylate dispersant level was held constant at 0.11% by cement weight, and tributyl phosphate was added at 0.01% so that air contents would be less than 3%.

TABLE 9

|  | Sample | | | | | |
| --- | --- | --- | --- | --- | --- | --- |
|  | S-84 | S-85 | S-86 | S-87 | S-88 | S-89 |
| Cement (lbs/yd3) | 511 | 510 | 511 | 512 | 511 | 511 |
| Sand (lbs/yd3) | 1321 | 1347 | 1348 | 1351 | 1350 | 1330 |
| Stone (lbs/yd3) | 1864 | 1901 | 1903 | 1907 | 1905 | 1877 |
| Water (lbs/yd3) | 333 | 290 | 290 | 291 | 291 | 309 |
| Water/Cement | 0.65 | 0.57 | 0.57 | 0.57 | 0.57 | 0.60 |
| Sand/Aggregate | 0.43 | 0.43 | 0.43 | 0.43 | 0.43 | 0.43 |
| PC Disp (% cwt) |  | 0.11 | 0.11 | 0.11 | 0.11 | 0.11 |
| Na Gluconate/G.A. (%/cwt) |  | 0.03 | 0.03 | 0.03 |  |  |
| Tetrahydroxyethyl ethylenediamine (% cwt) |  |  | 0.03 |  | 0.03 |  |
| Triisopropanolamine (% cwt) |  |  |  | 0.03 |  |  |
| TBP (% cwt) |  | 0.01 | 0.01 | 0.01 | 0.01 | 0.01 |
| Slump (in) | 8.00 | 8.00 | 8.00 | 8.50 | 6.75 | 8.00 |
| % Air | 1.0 | 2.2 | 2.1 | 1.9 | 2.0 | 2.0 |
| Initial Set (Hrs.) | 5.58 | 6.62 | 6.85 | 6.75 | 6.05 | 5.93 |
| Compressive Strengths (psi) | | | | | | |
| 7 Day | 3260 | 4440 | 4710 | 4950 | 4730 | 4450 |
| 28 Day | 5060 | 6200 | 6760 | 7080 | 6600 | 5960 |

PC Disp - polycarboxylate dispersant
Na Gluconate/G.A. - sodium gluconate gluconic acid blend
TBP - tributyl phosphate Table 9 shows the setting time and 28-day compressive strength comparisons of polycarboxylate dispersant only (S-89), polycarboxylate dispersant plus set retarder (S-85), and polycarboxylate dispersant plus set retarder and tetrahydroxyethylethylenediamine (S-86) and polycarboxylate dispersant plus set retarder and poly(hydroxyalkyl)amine (S-87). Relative to the polycarboxylate only reference (S-89), addition of set retarder (S-85) increased setting time by about 40 minutes and increased 28-day compressive strength. Sample S-86, containing the tetrahydroxyethylethylenediamine, and S-87, containing poly(hydroxyalkyl)amine, show a similar increase in 28-day compressive strength over the polycarboxylate plus set retarder without a significant change in setting time.

An unexpected performance improvement of the three component combination of polycarboxylate dispersant, retarder and strength improvement additive is the significant increase in very early compressive strength in the cementitious compositions. Tables 10 and 11 show 12-hour compressive strength comparisons between a polycarboxylate dispersant and the combination of polycarboxylate dispersant, retarder and strength improvement additive. The mix design was based on a nominal cement content of 700 lb/yd$^3$ using a Type I cement (Table 10) and a Type III cement (Table 11). For all of the concrete mixtures in Table 10, the polycarboxylate dispersant level was held constant at 0.11% to 0.12% by cement weight, and an EO/PO type defoamer was used at 0.0029% by cement weight. For all of the concrete mixtures in Table 11, the polycarboxylate dispersant level was held constant at 0.20 to 0.22% by cement weight, and an EO/PO type defoamer was used at a level proportional to the polycarboxylate dispersant as in Table 10.

TABLE 10

|  | Sample | | | |
| --- | --- | --- | --- | --- |
|  | S-90 | S-91 | S-92 | S-93 |
| Cement (lbs/yd3) | 702 | 699 | 698 | 702 |
| Sand (lbs/yd3) | 1268 | 1263 | 1261 | 1268 |
| Stone (lbs/yd3) | 1818 | 1810 | 1807 | 1818 |
| Water (lbs/yd3) | 286 | 285 | 284 | 286 |

TABLE 10-continued

|  | Sample | | | |
| --- | --- | --- | --- | --- |
|  | S-90 | S-91 | S-92 | S-93 |
| Water/Cement | 0.407 | 0.407 | 0.407 | 0.407 |
| Sand/Aggregate | 0.43 | 0.43 | 0.43 | 0.43 |
| PC Disp. (% cwt) | 0.122 | 0.112 | 0.112 | 0.122 |
| Polysacchride (% cwt) |  | 0.0001 | 0.016 |  |
| Na Gluconate/G.A. (% cwt) |  |  |  | 0.0026 |
| SIA (% cwt) |  | 0.0001 | 0.016 | 0.0016 |
| Defoamer | 0.0029 | 0.0029 | 0.0029 | 0.0029 |
| Slump (in) | 8.00 | 8.50 | 8.50 | 7.75 |
| Air Content (%) | 2.2 | 2.6 | 2.8 | 2.2 |
| Initial Set (Hrs) | 4.98 | 5.10 | 5.20 | 5.05 |
| Compressive Strengths (psi) | | | | |
| 12 hr | 1290 | 1610 | 1750 | 1690 |
| 1 Day | 3670 | 4060 | 4200 | 3740 |

PC Disp—polycarboxylate dispersant
SIA—strength improvement additive
Na Gluconate/G.A.—sodium gluconate gluconic acid blend Table 10 shows the setting time and 12 hour compressive strength comparisons of polycarboxylate dispersant only (S-90), and polycarboxylate dispersant plus set retarder and strength improvement additive (S-91 to S-93). Relative to the polycarboxylate only reference (S-90), mixtures containing the three component combination (S-91 to S-93) had similar setting times and significantly increased 12 hour compressive strengths.

TABLE 11

|  | Sample | | | | |
| --- | --- | --- | --- | --- | --- |
|  | S-94 | S-95 | S-96 | S-97 | S-98 |
| Cement (lbs/yd3) | 706 | 703 | 703 | 703 | 705 |
| Sand (lbs/yd3) | 1281 | 1276 | 1276 | 1275 | 1280 |
| Stone (lbs/yd3) | 1837 | 1830 | 1830 | 1828 | 1836 |
| Water (lbs/yd3) | 283 | 282 | 282 | 281 | 282 |
| Water/Cement | 0.400 | 0.400 | 0.400 | 0.400 | 0.400 |
| Sand/Aggregate | 0.43 | 0.43 | 0.43 | 0.43 | 0.43 |
| PC Disp. (% cwt) | 0.204 | 0.213 | 0.214 | 0.214 | 0.225 |
| Polysacchride (% cwt) |  | 0.0195 | 0.0076 | 0.029 |  |
| Na Gluconate/G.A. (% cwt) |  |  |  |  | 0.0044 |
| SIA (% cwt) |  | 0.0265 | 0.0076 | 0.029 | 0.0027 |
| Defoamer | 0.0048 | 0.0049 | 0.0054 | 0.0054 | 0.005 |
| Slump (in) | 8.75 | 9.00 | 8.00 | 8.50 | 8.00 |
| Air Content (%) | 1.6 | 2.0 | 2.0 | 2.1 | 1.7 |
| Initial Set (Hrs.) | 3.03 | 4.08 | 3.61 | 4.05 | 3.43 |
| Compressive Strengths (psi) | | | | | |
| 12 Hour | 3930 | 4260 | 4580 | 4380 | 4300 |
| 1 Day | 5690 | 6480 | 6420 | 6530 | 6260 |

PC Disp - polycarboxylate dispersant
SIA - strength improvement additive
Na Gluconate/G.A. - sodium gluconate gluconic acid blend In Table 11, mixture samples S-95 to S-98, containing the three component combination showed a slight increase in setting time relative to the polycarboxylate only reference, and significantly increased 12 hour and 1-day compressive strengths.

It will be understood that the embodiment(s) described herein is/are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

We claim:
1. A strength improvement admixture composition comprising:
 a. polycarboxylate dispersant;
 b. set retarder; and
 c. a strength improvement additive selected from the group consisting of poly(hydroxyalkylated)polyethyleneamines, poly(hydroxyalkylated)polyethylenepolyamines, poly(hydroxyalkylated)polyethyleneimines, poly(hydroxyalkylated)polyamines, hydrazines, 1,2-diaminopropane, polyglycoldiamine, poly(hydroxyalkyl) amines and mixtures thereof;
 wherein the amount of polycarboxylate dispersant is from about 5% to about 80%, the set retarder is from about 0.5% to about 40%, and the strength improvement additive is from about 0.5% to about 40% based on the total dry weight of the admixture composition components.
2. The admixture composition of claim 1, wherein the amount of polycarboxylate dispersant is from about 20% to about 60%, the set retarder is from about 2% to about 25%, and the strength improvement additive is from about 2% to about 25% based on the total dry weight of the admixture composition components.

3. The admixture composition of claim 1, wherein the strength improvement additive is selected from the group consisting of N,N,N'-tri -(hydroxyethyl)ethylenediamine, N,N,N'-tri-(hydroxyethyl)diethylenediamine, N,N'-di -(hydroxyethyl)ethylenediamine, N,N'-bis(2-hydroxypropyl)diethylenetriamine, N,N,N',N'-tetra(hydroxyethyl)ethylenediamine, N,N,N',N',N''-penta(hydroxyethyl) diethylenetriamine, N,N'-bis(2-hydroxypropyl)-N,N,N'-tri (hydroxyethyl)diethylenetriamine, and mixtures thereof.

4. The admixture composition of claim 1, wherein the strength improvement additive comprises poly(hydroxyethyl)polyethyleneimine.

5. The admixture composition of claim 1, wherein the strength improvement additive comprises poly(hydroxyalkylated)polyethyleneamine having the following formula:

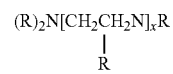

wherein x is 1,2 or 3 and R is selected from the group consisting of hydrogen, 2-hydroxyethyl, and 2-hydroxypropyl, each R can be the same or different, and at least 40% of the R groups are hydroxyalkyl, with no more than 40% of the R groups being hydroxypropyl.

6. The admixture composition of claim 1, wherein the strength improvement additive has the following formula:

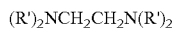

wherein R' is $(CH_2CH_2O)_yH$, wherein y is 0, 1 or 2, wherein no more than one-half (½) of the compounds of the formula have y equal to 0, and each R' can be the same or different.

7. The admixture composition of claim 1, wherein the strength improvement additive has the following formula:

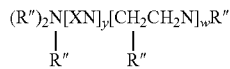

wherein R" is selected from the group consisting of $(CH_2CH_2O)_yH$ and

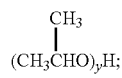

wherein X is a covalent bond or a divalent organic radical selected from the group consisting of $CH_2$, $CH_2CH_2$,

and $CH_2CH_2CH_2OCH_2CH_2OCH_2CH_2OCH_2CH_2CH_2$;
wherein y and v are 0, 1 or 2;
wherein w is 0 or 1;
wherein v and w cannot both be 0; and wherein no more than one-half (½) of the R" groups are hydrogen.

8. The admixture composition of claim 1 wherein the set retarder is selected from the group consisting of an oxy-boron compound, a polyphosphonic acid, lignosulfonates, sulphonic acid-acrylic acid copolymer, and their corresponding salts, carboxylic acid, hydroxycarboxylic acid, polycarboxylic acid, hydroxylated carboxylic acid, fumaric, itaconic, malonic, borax, gluconic, and tartaric acid, ascorbic acid, isoascorbic acid, polyhydroxysilane, polyacrylamide, carbohydrates and mixtures thereof.

9. The admixture composition of claim 1 further comprising at least one of set accelerators, air detraining agents, air entraining agents, shrinkage reducing admixtures, water reducers, foaming agents, dampproofing admixtures, pumping aids, fungicidal admixtures, insecticidal admixtures, germicidal admixtures, alkali activity reducers, bonding admixtures, corrosion inhibitors, and pigments.

10. The admixture composition of claim 1, wherein the admixture composition is in an aqueous solution.

11. A cementitious composition comprising hydraulic cement and a strength improvement admixture composition, said admixture composition comprising:
a. polycarboxylate dispersant;
b. set retarder; and
c. a strength improvement additive selected from the group consisting of a poly(hydroxyalkylated)polyethyleneamines, poly(hydroxyalkylated)polyethylenepolyamines, poly(hydroxyalkylated)polyethyleneimines, poly(hydroxyalkylated)polyamines, hydrazines, 1,2-diaminopropane, polyglycoldiamine, poly(hydroxyalkyl) amines and mixtures thereof;
wherein the amount of polycarboxylate dispersant is from about 5% to about 80%, the set retarder is from about 0.5% to about 40%, and the strength improvement additive is from about 0.5% to about 40% based on the total dry weight of the admixture composition components.

12. The cementitious composition of claim 11, wherein the amount of polycarboxylate dispersant is from about 0.02% to about 2%, the set retarder is from about 0.002% to about 0.2%, the strength improvement additive is from about 0.0001% to about 0.2% by weight of cementitious binder.

13. The cementitious composition of claim 11, wherein the amount of polycarboxylate dispersant is from about 0.02% to about 0.24%, the set retarder is from about 0.005% to about 0.08%, the strength improvement additive is from about 0.004% to about 0.08% by weight of cementitious binder.

14. The cementitious composition of claim 11, wherein the strength improvement additive is selected from the group consisting of N,N,N'-tri-(hydroxyethyl)ethylenediamine, N,N,N'-tri-(hydroxyethyl)diethylenediamine, N,N'-di-(hydroxyethyl)ethylenediamine, N,N'-bis(2-hydroxypropyl)diethylenetriamine, N,N,N',N'-tetra(hydroxyethyl)ethylenediamine, N,N,N',N',N''-penta(hydroxyethyl)diethylenetriamine, N,N'-bis(2-hydroxypropyl)-N,N,N'-tri(hydroxyethyl)diethylenetriamine, and mixtures thereof.

15. The cementitious composition of claim 11, wherein the strength improvement additive comprises poly(hydroxyethyl)polyethyleneimine.

16. The cementitious composition of claim 11, wherein the strength improvement additive comprises poly(hydroxyalkylated)polyethyleneamine having the following formula:

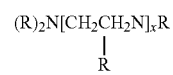

wherein x is 1,2 or 3 and R is selected from the group consisting of hydrogen, 2-hydroxyethyl, and 2-hydroxypropyl, each R can be the same or different, and at least 40% of the R groups are hydroxyalkyl, with no more than 40% of the R groups being hydroxypropyl.

17. The cementitious composition of claim 11, wherein the strength improvement additive has the following formula:

wherein R' is $(CH_2CH_2O)_yH$, wherein y is 0, 1 or 2, wherein no more than one-half (½) of the compounds of the formula have y equal to 0, and each R' can be the same or different.

18. The cementitious composition of claim 11, wherein the strength improvement additive has the following formula:

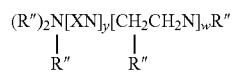

wherein R" is selected from the group consisting of $(CH_2CH_2O)_yH$ and

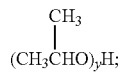

wherein X is a covalent bond or a divalent organic radical selected from the group consisting of $CH_2$, $CH_2CH_2$,

and $CH_2CH_2CH_2OCH_2CH_2OCH_2CH_2OCH_2CH_2CH_2$;
wherein y and v are 0, 1 or 2;

wherein w is 0 or 1;
wherein v and w cannot both be 0; and wherein no more than one-half (½) of the R″ groups are hydrogen.

19. The cementitious composition of claim 11 wherein the set retarder is selected from the group consisting of an oxyboron compound, a polyphosphonic acid, lignosulfonates, sulphonic acid-acrylic acid copolymer, and their corresponding salts, carboxylic acid, hydroxycarboxylic acid, polycarboxylic acid, hydroxylated carboxylic acid, fumaric, itaconic, malonic, borax, gluconic, and tartaric acid, ascorbic acid, isoascorbic acid, polyhydroxysilane, polyacrylamide, carbohydrates and mixtures thereof.

20. The cementitious composition of claim 11, wherein the cement is selected from the group consisting of portland cement, modified portland cement, or masonry cement, and mixtures thereof.

21. The cementitious composition of claim 11 wherein the hydraulic cement is portland cement.

22. The cementitious composition of claim 11 further comprising a cement admixture or additive that is selected from the group consisting of set accelerator, air detraining agent, air entraining agent, foaming agent, corrosion inhibitor, shrinkage reducing admixture, water reducer, fiber, pigment, pozzolan, clay, strength enhancing agents, rheology modifying agents, water repellents, wetting agents, water soluble polymers, dampproofing admixtures, gas formers, permeability reducers, pumping aids, fungicidal admixtures, germicidal admixtures, insecticidal admixtures, aggregates, alkali-reaction reducers, bonding admixtures, and mixtures thereof.

23. The cementitious composition of claim 22, wherein the aggregate is at least one of silica, quartz, crushed round marble, glass spheres, granite, limestone, calcite, feldspar, alluvial sands, and sand.

24. The cementitious composition of claim 22, wherein the pozzolan is at least one of natural pozzolan, metakaolin, fly ash, silica fume, calcined clay, and blast furnace slag.

25. The composition of claim 1 or 11 wherein the polycarboxylate dispersant comprises at least one of
A) a dispersant of Formula (I):

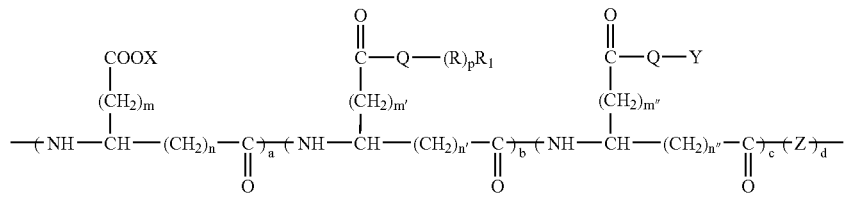

wherein in Formula (I)
X is at least one of hydrogen, an alkali earth metal ion, an alkaline earth metal ion, ammonium ion, or amine;
R is at least one of $C_1$ to $C_6$ alkyl(ene) ether or mixtures thereof or $C_1$ to $C_6$ alkyl(ene) imine or mixtures thereof;
Q is at least one of oxygen, NH, or sulfur;
p is a number from 1 to about 300 resulting in at least one of a linear side chain or branched side chain;
$R_1$ is at least one of hydrogen, $C_1$ to $C_{20}$ hydrocarbon, or functionalized hydrocarbon containing at least one of —OH, —COOH, an ester or amide derivative of —COOH, sulfonic acid, an ester or amide derivative of sulfonic acid, amine, or epoxy;
Y is at least one of hydrogen, an alkali earth metal ion, an alkaline earth metal ion, ammonium ion, amine, a hydrophobic hydrocarbon or polyalkylene oxide moiety that functions as a defoamer;

m, m′, m″, n, n′, and n″ are each independently 0 or an integer between 1 and about 20;
Z is a moiety containing at least one of i) at least one amine and one acid group, ii) two functional groups capable of incorporating into the backbone selected from the group consisting of dianhydrides, dialdehydes, and di-acid-chlorides, or iii) an imide residue; and
wherein a, b, c, and d reflect the mole fraction of each unit wherein the sum of a, b, c, and d equal one, wherein a, b, c, and d are each a value greater than or equal to zero and less than one, and at least two of a, b, c, and d are greater than zero;
b) a dispersant of Formula (II):

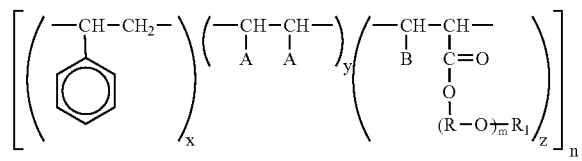

wherein in Formula (II):
A is COOM or optionally in the "y" structure an acid anhydride group (—CO—O—CO—) is formed in place of the A groups between the carbon atoms to which the A groups are bonded to form an anhydride;
B is COOM
M is hydrogen, a transition metal cation, the residue of a hydrophobic polyalkylene glycol or polysiloxane, an alkali metal ion, an alkaline earth metal ion, ferrous ion, aluminum ion, (alkanol)ammonium ion, or (alkyl)ammonium ion;
R is a $C_{2-6}$ alkylene radical;
R1 is a $C_{1-20}$ alkyl, $C_{6-9}$ cycloalkyl, or phenyl group;
x, y, and z are a number from 0.01 to 100;
m is a number from 1 to 100; and
n is a number from 10 to 100;
c) a dispersant comprising at least one polymer or a salt thereof having the form of a copolymer of
i) a maleic anhydride half-ester with a compound of the formula RO(AO)$_m$H, wherein R is a $C_1$-$C_{20}$ alkyl group, A is a $C_{2-4}$ alkylene group, and m is an integer from 2-16; and
ii) a monomer having the formula CH$_2$=CHCH$_2$—(OA)$_n$OR, wherein n is an integer from 1-90 and R is a $C_{1-20}$ alkyl group;

d) a dispersant obtained by copolymerizing 5 to 98% by weight of an (alkoxy)polyalkylene glycol mono(meth)acrylic ester monomer (a) represented by the following general formula (1):

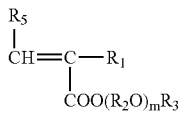

(1)

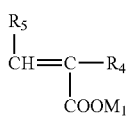

(2)

wherein $R_1$ stands for hydrogen atom or a methyl group, $R_2O$ for one species or a mixture of two or more species of oxyalkylene group of 2 to 4 carbon atoms, providing two or more species of the mixture may be added either in the form of a block or in a random form, $R_3$ for a hydrogen atom or an alkyl group of 1 to 5 carbon atoms, and m is a value indicating the average addition mol number of oxyalkylene groups that is an integer in the range of 1 to 100, 95 to 2% by weight of a (meth)acrylic acid monomer (b) represented by the above general formula (2), wherein $R_4$ and $R_5$ are each independently a hydrogen atom or a methyl group, and $M_1$ for a hydrogen atom, a monovalent metal atom, a divalent metal atom, an ammonium group, or an organic amine group, and 0 to 50% by weight of other monomer (c) copolymerizable with these monomers, provided that the total amount of (a), (b), and (c) is 100% by weight;

e) a graft polymer that is a polycarboxylic acid or a salt thereof, having side chains derived from at least one species selected from the group consisting of oligoalkyleneglycols, polyalcohols, polyoxyalkylene amines, and polyalkylene glycols;

f) a dispersant of Formula (III):

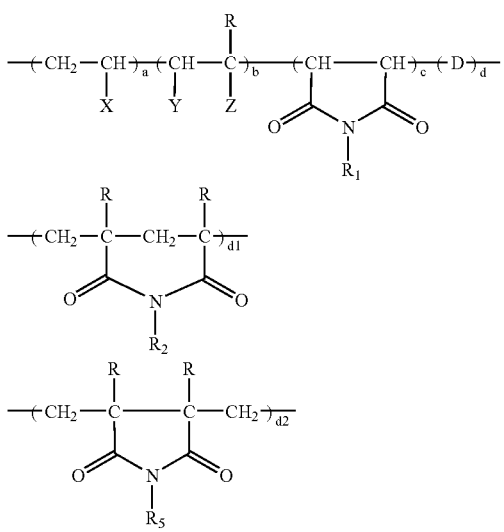

wherein in Formula (III):
D = a component selected from the group consisting of the structure d1, the structure d2, and mixtures thereof;

X = H, $CH_3$, $C_2$ to $C_6$ Alkyl, Phenyl, p-Methyl Phenyl, or Sulfonated Phenyl;
Y = H or —COOM;
R = H or $CH_3$;
Z = H, —$SO_3M$, —$PO_3M$, —COOM, —$O(CH_2)_nOR_3$ where n=2 to 6,
—$COOR_3$, or —$(CH_2)_nOR_3$ where n =0 to 6,
—$CONHR_3$, —$CONHC(CH_3)_2$ $CH_2SO_3M$, —COO$(CHR_4)OH$ where n=2 to 6, or —$O(CH_2)_nOR_4$ wherein n =2 to 6;
$R_1$, $R_2$, $R_3$, $R_5$ are each independently —$(CHRCH_2O)_mR_4$ random copolymer of oxyethylene units and oxypropylene units where m=10 to 500 and wherein the amount of oxyethylene in the random copolymer is from about 60% to 100% and the amount of oxypropylene in the random copolymer is from 0% to about 40%;
$R_4$ = H, Methyl, $C_2$ to about $C_6$ Alkyl, or about $C_6$ to about $C_{10}$ aryl;
M = H, Alkali Metal, Alkaline Earth Metal, Ammonium, Amine, triethanol amine, Methyl, or $C_2$ to about $C_6$ Alkyl;
a = 0 about 0.8;
b = about 0.2 to about 1.0;
c = 0 about 0.5;
d = 0 to about 0.5; and
wherein a, b, c, and d represent the mole fraction of each unit and the sum of a, b, c, and d is 1.0;

g) a dispersant of Formula (IV):

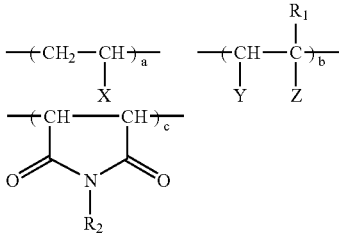

wherein in Formula (IV):
the "b" structure is one of a carboxylic acid monomer, an ethylenically unsaturated monomer, or maleic anhydride wherein an acid anhydride group (—CO—O—CO—) is formed in place of the groups Y and Z between the carbon atoms to which the groups V and Z are bonded respectively, and the "b" structure must include at least one moiety with a pendant ester linkage and at least one moiety with a pendant amide linkage;
X = H, $CH_3$, $C_2$ to $C_6$ Alkyl, Phenyl, p-Methyl Phenyl, p-Ethyl Phenyl, Carboxylated Phenyl, or Sulfonated Phenyl;
Y = H, —COOM, —COOH, or W;
W = a hydrophobic defoamer represented by the formula $R_5O$—$(CH_2CH_2O)_s$—$(CH_2C(CH_3)HO)_t$—$(CH_2CH_2O)_u$ where s, t, and u are integers from 0 to 200 with the proviso that t>(s+u) and wherein the total amount of hydrophobic defoamer is present in an amount less than about 10% by weight of the polycarboxylate dispersant;
Z = H, —COOM, —$O(CH_2)_nOR_3$ where n=2 to 6, —$COOR_3$, —$(CH_2)_nOR_3$ where n =0 to 6, or —$CONHR_3$;
$R_1$ = H, or $CH_3$;

$R_2$, $R_3$, are each independently a random copolymer of oxyethylene units and oxypropylene units of the general formula —$(CH(R_1)CH_2O)_mR_4$ where m=10 to 500 and wherein the amount of oxyethylene in the random copolymer is from about 60% to 100% and the amount of oxypropylene in the random copolymer is from 0% to about 40%;

$R_4$ =H, Methyl, or $C_2$ to $C_8$ Alkyl;

$R_5$ =$C_1$ to $C_{18}$ alkyl or $C_6$ to $C_{18}$ alkyl aryl;

M =Alkali Metal, Alkaline Earth Metal, Ammonia, Amine, monoethanol amine, diethanol amine, triethanol amine, morpholine, imidazole;

a =0.01-0.8;

b =0.2-0.99;

c =0-0.5; and wherein a, b, c represent the mole fraction of each unit and the sum of a, b, and c, is 1;

h) a random copolymer corresponding to the following Formula (V) in free acid or salt form having the following monomer units and numbers of monomer units:

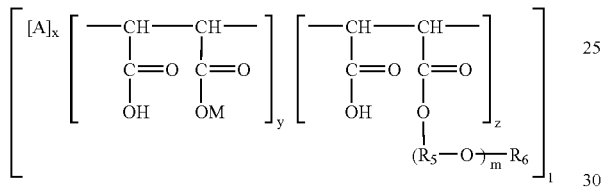

wherein A is selected from the moieties (i) or (ii)

(i) —$CR_1R_2$—$CR_3R_4$—

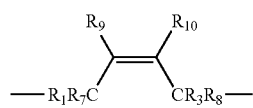

wherein $R_1$ and $R_3$ are selected from substituted benzene, $C_{1-8}$ alkyl, $C_{2-8}$ alkenyl, $C_{2-8}$ alkylcarbonyl, $C_{1-8}$ alkoxy, carboxyl, hydrogen, and a ring, $R_2$ and $R_4$ are selected from the group consisting of hydrogen and $C_{1-4}$ alkyl, wherein $R_1$ and $R_3$ can together with $R_2$ and/or $R_4$ when $R_2$ and/or $R_4$ are $C_{1-4}$ alkyl form the ring;

$R_7$, $R_8$, $R_9$, and $R_{10}$ are individually selected from the group consisting of hydrogen, $C_{1-6}$ alkyl, and a $C_{2-8}$ hydrocarbon chain, wherein $R_1$ and $R_3$ together with $R_7$ and/or $R_8$, $R_9$, and $R_{10}$ form the $C_{2-8}$ hydrocarbon chain joining the carbon atoms to which they are attached, the hydrocarbon chain optionally having at least one anionic group, wherein the at least one anionic group is optionally sulfonic;

M is selected from the group consisting of hydrogen, and the residue of a hydrophobic polyalkylene glycol or a polysiloxane, with the proviso that when A is (ii) and M is the residue of a hydrophobic polyalkylene glycol, M must be different from the group —$(R_5O)_mR_6$;

$R_5$ is a $C_{2-8}$ alkylene radical;

$R_6$ is selected from the group consisting of $C_{1-20}$ alkyl, $C_{6-9}$ cycloalkyl and phenyl;

n, x, and z are numbers from 1 to 100;

y is 0 to 100;

m is 2 to 1000;

the ratio of x to (y+z) is from 1:10 to 10:1 and the ratio of y:z is from 5:1 to 1:100;

i) a copolymer of oxyalkyleneglycol-alkenyl ethers and unsaturated dicarboxylic acids, comprising:

i) 0 to 90 mol % of at least one component of the formula 3a or 3b:

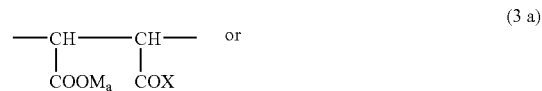

wherein M is a hydrogen atom, a mono- or divalent metal cation, an ammonium ion or an organic amine residue, a is 1, or when M is a divalent metal cation a is ½;

wherein X is —$OM_a$,

—O—$(C_mH_{2m}O)_n$—$R^1$ in which $R^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulphonic substituted aryl radical containing 6 to 14 carbon atoms, m is 2 to 4, and n is 0 to 100, —$NHR_2$,—$N(R^2)_2$ or mixtures thereof in which $R^2$=$R^1$ or —CO—$NH_2$; and wherein Y is an oxygen atom or —$NR^2$;

ii) 1 to 89 mol% of components of the general formula 4:

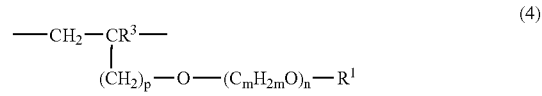

wherein $R_3$ is a hydrogen atom or an aliphatic hydrocarbon radical containing from 1 to 5 carbon atoms, p is 0 to 3, and $R_1$ is hydrogen, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulfonic substituted aryl radical containing 6 to 14 carbon atoms, m is 2 to 4, and n is 0 to 100, and iii) 0.1 to 10 mol % of at least one component of the formula 5a or 5b:

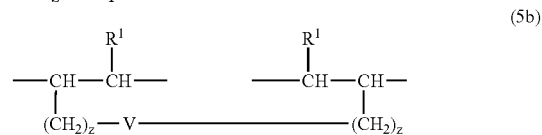

wherein S is a hydrogen atom or —$COOM_a$ or —$COOR_5$, T is —$COOR_5$, —W—$R_7$, —CO—[—

NH—(CH2)3)-]$_s$—W—R$_7$, —CO—O—(CH$_2$)$_z$—W—R$_7$, a radical of the general formula:

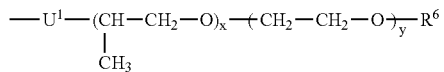

or —(CH$_2$)$_z$—V—(CH$_2$)$_z$—CH═CH—R$_1$, or when S is —COOR$_5$ or —COOM$_a$, U$_1$ is —CO—NHM—, —O—or —CH$_2$O, U$_2$ is —NH—CO—, —O—or —OCH$_2$, V is —O—CO—-C$_6$H$_4$—CO—O—or —W—, and W is

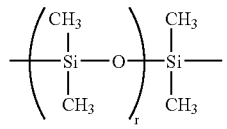

R4 is a hydrogen atom or a methyl radical, R5 is an aliphatic hydrocarbon radical containing 3 to 20 carbon atoms, a cycloaliphatic hydrocarbon radical containing 5 to 8 carbon atoms or an aryl radical containing 6 to 14 carbon atoms, R$_6$═R$_1$, or

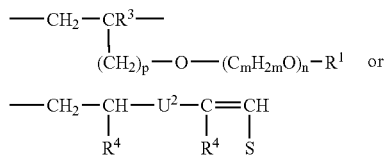

R$_{7═R1}$or

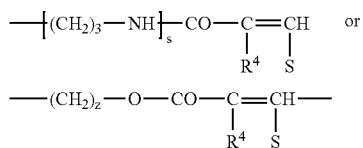

r is 2 to 100, s is 1 or 2, x is 1 to 150, y is 0 to 15 and z is 0 to 4;

iv) 0 to 90 mol % of at least one component of the formula 6a, 6b, or 6c:

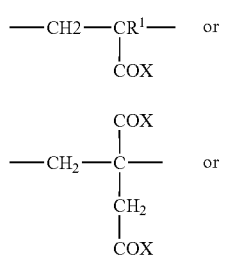

(6c)

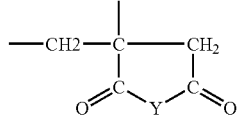

wherein M is a hydrogen atom, a mono- or divalent metal cation, an ammonium ion or an organic amine residue, a is 1, or when M is a divalent metal cation a is ½;

wherein X is —OM$_a$,
—O—(C$_m$H$_{2m}$O)$_n$—R$^1$ in which R$^1$is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, C$_{1-14}$ alkyl, or sulphonic substituted aryl radical containing 6 to 14 carbon atoms, m is 2 to 4, and n is 0 to 100,
—NH—(C$_m$H$_{2m}$O)$_n$—R$^1$,
—NHR$_2$,—N(R$^2$)$_2$ or mixtures thereof in which R$^2$═R$^1$or —CO—NH$_2$; and wherein Y is an oxygen atom or —NR$^2$;

j) a copolymer of dicarboxylic acid derivatives and oxyalkylene glycol-alkenyl ethers, comprising:
i) 1 to 90 mol.% of at least one member selected from the group consisting of structural units of formula 7a and formula 7b:

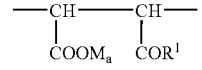

(7a)

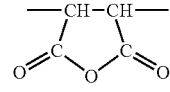

(7b)

wherein M is H, a monovalent metal cation, a divalent metal cation, an ammonium ion or an organic amine;
a is ½ when M is a divalent metal cation or 1 when M is a monovalent metal cation;
wherein R$^1$is —OM$_a$, or
—O—(C$_m$H$_{2m}$O)$_n$—R$^2$ wherein R$^2$ is H, a C$_{1-20}$ aliphatic hydrocarbon, a C$_{5-8}$ cycloaliphatic hydrocarbon, or a C$_{6-14}$ aryl that is optionally substituted with at least one member selected from the group consisting of—COOM$_a$, —(SO$_3$)M$_a$, and —(PO$_3$)M$_{a2}$;
m is 2 to 4;
n is 1 to 200;
ii) 0.5 to 80 mol.% of the structural units of formula 8:

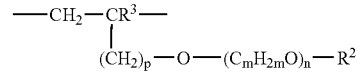

(8)

wherein R$^3$ is H or a C$_{1-5}$ aliphatic hydrocarbon;
p is 0 to 3;
R$^2$ is H, a C$_{1-20}$ aliphatic hydrocarbon, a C$_{5-8}$ cycloaliphatic hydrocarbon, or a C$_{6-14}$ aryl that is optionally substituted with at least one member selected from the group consisting of —COOk$_a$, —(SO$_3$)M$_a$, and —(PO$_3$) M$_a$;
m is 2 to 4;
n is 1 to 200;
iii) 0.5 to 80 mol.% structural units selected from the group consisting of formula 9a and formula 9b:

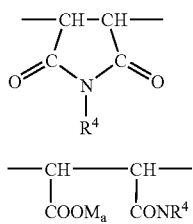
(9a)

—CH——CH—
     |          |
  COOM$_a$   CONR$^4$
(9b)

wherein R$^4$ is H, C$_{1-20}$ aliphatic hydrocarbon that is optionally substituted with at least one hydroxyl group, —(C$_m$H$_{2m}$O)$_n$—R$^2$, —CO—NH—R$^2$, C$_{5-8}$ cycloaliphatic hydrocarbon, or a C$_{6-14}$ aryl that is optionally substituted with at least one member selected from the group consisting of —COOM$_a$, —(SO$_3$)M$_a$, and —(PO$_3$)M$_{a2}$;
M is H, a monovalent metal cation, a divalent metal cation, an ammonium ion or an organic amine;
a is ½ when M is a divalent metal cation or 1 when M is a monovalent metal cation;
R$^2$ is H, a C$_{1-20}$ aliphatic hydrocarbon, a C$_{5-8}$ cycloaliphatic hydrocarbon, or a C$_{6-14}$ aryl that is optionally substituted with at least one member selected from the group consisting of —COOM$_a$, —(SO$_3$)M$_a$, and —(PO$_3$)M$_{a2}$;
m is 2 to 4;
n is 1 to 200;
iv) 1 to 90 mol.% of structural units of formula 10

(10)

wherein R$^5$ is methyl, or methylene group, wherein R$^5$ forms one or more 5 to 8 membered rings with R$^7$;
R$^6$ is H, methyl, or ethyl;
R$^7$ is H, a C$_{1-20}$ aliphatic hydrocarbon, a C$_{6-14}$ aryl that is optionally substituted with at least one member selected from the group consisting of —COOM$_a$, —(SO$_3$)M$_a$, and —(PO$_3$)M$_{a2}$, a C$_{5-8}$ cycloaliphatic hydrocarbon, —OCOR$^4$, OR$^4$, and —COOR$^4$, wherein R$^4$ is H, a C$_{1-20}$ aliphatic hydrocarbon that is optionally substituted with at least one —OH, —(C$_m$H$_{2m}$O)$_n$—R$^2$, —CO—NH—R$^2$, C$_{5-8}$ cycloaliphatic hydrocarbon, or a C$_{6-14}$ aryl residue that is optionally substituted with a member selected from the group consisting of —COOM$_a$, —(SO$_3$)M$_a$, and —(PO$_3$)M$_{a2}$.

* * * * *